United States Patent
Uehara et al.

(10) Patent No.: US 8,533,381 B2
(45) Date of Patent: Sep. 10, 2013

(54) COMPUTER SYSTEM, METHOD OF MANAGING PCI SWITCH, AND MANAGEMENT SERVER

(75) Inventors: Keitaro Uehara, Kokubunji (JP); Takashige Baba, Inagi (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 350 days.

(21) Appl. No.: 12/709,405

(22) Filed: Feb. 19, 2010

(65) Prior Publication Data

US 2010/0211717 A1  Aug. 19, 2010

(30) Foreign Application Priority Data

Feb. 19, 2009  (JP) ................. 2009-036962

(51) Int. Cl.
*G06F 13/00* (2006.01)
(52) U.S. Cl.
USPC ........................................ 710/316
(58) Field of Classification Search
USPC ........................................ 710/316
See application file for complete search history.

(56) References Cited

U.S. PATENT DOCUMENTS

| | | | |
|---|---|---|---|
| 6,189,058 B1 * | 2/2001 | Jones et al. | 710/302 |
| 6,338,107 B1 * | 1/2002 | Neal et al. | 710/302 |
| 7,043,575 B2 * | 5/2006 | Stephan | 710/36 |
| 7,058,738 B2 | 6/2006 | Stufflebeam, Jr. | |
| 7,809,977 B2 | 10/2010 | Takamoto | |
| 7,827,258 B1 * | 11/2010 | Kalbarga | 709/223 |
| 7,835,380 B1 * | 11/2010 | Aloni et al. | 370/419 |
| 7,991,839 B2 | 8/2011 | Freimuth et al. | |
| 2003/0012204 A1 | 1/2003 | Czeiger et al. | |
| 2003/0065752 A1 * | 4/2003 | Kaushik et al. | 709/220 |
| 2004/0088604 A1 * | 5/2004 | Bland et al. | 714/43 |

(Continued)

FOREIGN PATENT DOCUMENTS

| | | | |
|---|---|---|---|
| JP | 2005317021 A | * | 4/2005 |
| JP | 2005-317021 | | 11/2005 |

(Continued)

OTHER PUBLICATIONS

Mayhew et al., "PCI express and advanced switching: evolutionary path to building next generation interconnects," High Performance Interconnects, 2003. Proceedings. 11th Symposium on , pp. 21,29, Aug. 20-22, 2003.*

(Continued)

*Primary Examiner* — Faisal M Zaman
(74) *Attorney, Agent, or Firm* — Antonelli, Terry, Stout & Kraus, LLP.

(57) ABSTRACT

It is provided a computer system including computers, PCI switches each having first and second ports, a switch management module and a power control module. The switch management module includes an identifying module for identifying a first port coupled to the computer to be booted up, and notifying the PCI switch of the first port, an instruction module for instructing the power control module to boot up the computer, and an allocation management module for managing allocation of one of the I/O device to the computer and notifying the one of the PCI switches of the allocation after the computer is booted up. The PCI switches includes a preventing control module for preventing the computer from detecting a configuration of the first port, and a virtual switch generating module for generating a virtual switch that couples the first port and the second port based on the notification.

6 Claims, 37 Drawing Sheets

(56) References Cited

U.S. PATENT DOCUMENTS

| | | | |
|---|---|---|---|
| 2004/0103210 A1 | 5/2004 | Fujii et al. | |
| 2004/0187106 A1* | 9/2004 | Tanaka et al. | 718/1 |
| 2006/0130137 A1* | 6/2006 | Wewel et al. | 726/17 |
| 2006/0239287 A1* | 10/2006 | Johnsen et al. | 370/412 |
| 2006/0242353 A1* | 10/2006 | Torudbakken et al. | 710/316 |
| 2006/0277348 A1* | 12/2006 | Wooten | 710/315 |
| 2006/0294254 A1* | 12/2006 | Emerson et al. | 709/238 |
| 2007/0011500 A1* | 1/2007 | Dasari et al. | 714/100 |
| 2007/0112994 A1* | 5/2007 | Sandven et al. | 710/310 |
| 2007/0112996 A1* | 5/2007 | Manula et al. | 710/310 |
| 2007/0136504 A1* | 6/2007 | Wu | 710/302 |
| 2007/0165596 A1 | 7/2007 | Boyd et al. | |
| 2008/0040526 A1* | 2/2008 | Suzuki et al. | 710/302 |
| 2008/0117907 A1 | 5/2008 | Hein | |
| 2008/0147904 A1* | 6/2008 | Freimuth et al. | 710/22 |
| 2008/0183968 A1* | 7/2008 | Huang | 711/125 |
| 2008/0250186 A1* | 10/2008 | Suzuki et al. | 710/313 |
| 2009/0106471 A1* | 4/2009 | Kaushik et al. | 710/302 |
| 2009/0187694 A1* | 7/2009 | Baba et al. | 710/316 |
| 2009/0187754 A1* | 7/2009 | Hwang | 713/2 |
| 2009/0198862 A1* | 8/2009 | Okitsu et al. | 710/316 |
| 2009/0292849 A1* | 11/2009 | Khoo | 710/301 |
| 2010/0036995 A1 | 2/2010 | Nakayama et al. | |
| 2010/0082874 A1 | 4/2010 | Baba et al. | |
| 2010/0106884 A1* | 4/2010 | Abraham et al. | 710/316 |
| 2010/0153615 A1* | 6/2010 | Baba et al. | 710/316 |
| 2010/0161872 A1* | 6/2010 | Daniel | 710/316 |
| 2011/0004688 A1* | 1/2011 | Matthews et al. | 709/226 |
| 2011/0016235 A1* | 1/2011 | Brinkmann et al. | 710/8 |

FOREIGN PATENT DOCUMENTS

| | | |
|---|---|---|
| JP | 2008-046722 | 2/2008 |
| JP | 2009294828 A * | 12/2009 |
| JP | 2010079816 A * | 4/2010 |
| JP | 2010257209 A * | 11/2010 |
| JP | 2011171951 A * | 9/2011 |
| JP | 2012215987 A * | 11/2012 |
| WO | WO 2010044409 A1 * | 4/2010 |

OTHER PUBLICATIONS

Liboiron-Ladouceur et al., "An All-Optical PCI-Express Network Interface for Optical Packet Switched Networks," Optical Fiber Communication and the National Fiber Optic Engineers Conference, 2007. OFC/NFOEC 2007. Conference on , pp. 1,3, Mar. 25-29, 2007.*

Krishnan et al., "A Case Study in I/O Disaggregation using PCI Express Advanced Switching Interconnect (ASI)," High-Performance Interconnects, 14th IEEE Symposium on , pp. 15,24, Aug. 23-25, 2006.*

Ekman et al., "Gigabit switch using free-space and parallel optical data links for a PCI-based workstation cluster," Lasers and Electro-Optics Society 2000 Annual Meeting. LEOS 2000. 13th Annual Meeting. IEEE , vol. 2, pp. 494,495 vol. 2, 2000.*

Multi-Root I/O Virtualization and Sharing Specification Revision1. 0; PCI-SIG, May 12, 2008 and retrieved on Jan. 6, 2009 at PCI-SIG web site, URL; http://www.pcisig.com/specifications/iov/multi-root/.

Office Action issued in Japanese Patent Application No. 2009-036962 on Sep. 25, 2012.

* cited by examiner

| | 501 | 502 | 503 |
|---|---|---|---|
| | HOST | SWITCH | SLOT |
| | HOST A | MRSW#1 | SLOT#1 |
| | | | SLOT#2 |
| | | MRSW#2 | SLOT#1 |
| | | | SLOT#2 |
| | HOST B | MRSW#1 | SLOT#3 |
| | | | SLOT#4 |

HOST-SLOT ALLOCATION TABLE 500a

FIG. 3A

| | 501 | 502 | 503 |
|---|---|---|---|
| | HOST | SWITCH | SLOT |
| | 100b | 300b | 320b-1 |
| | | | 320b-2 |
| | | 300a | 320a-1 |
| | | | 320a-2 |
| | 100a | 300b | 320b-3 |
| | | | 320b-4 |

HOST-SLOT ALLOCATION TABLE 500b

FIG. 3B

| | 571 | 572 | 573 | 574 | 575 | 576 |
|---|---|---|---|---|---|---|
| | SWITCH | PORT # | DIRECTION | TYPE | LINK DESTINATION | LINK DESTINATION PORT |
| | 300b | 310b-1 | UP | HOST | 100b | 160b-1 |
| | | 310b-2 | UP | HOST | 100a | 160a-1 |
| | | 330b | UP | PCIM | 250 | - |
| | | 320b-1 | DOWN | DEVICE | 420b-1 | - |
| | | 320b-2 | DOWN | - | - | - |
| | | 320b-3 | DOWN | DEVICE | 420b-3 | - |
| | | 320b-4 | DOWN | DEVICE | 420b-4 | - |
| | 300a | 310a-1 | UP | HOST | 100b | 160b-2 |
| | | 310a-2 | UP | HOST | 100a | 160a-2 |
| | | 330a | UP | PCIM | 250 | - |
| | | 302a-1 | DOWN | DEVICE | 420a-1 | - |
| | | 302a-2 | DOWN | DEVICE | 420a-2 | - |
| | | 302a-3 | DOWN | - | - | - |
| | | 302a-4 | DOWN | - | - | - |

SWITCH PORT MANAGEMENT TABLE 570

*FIG. 5*

VIRTUAL BRIDGE MANAGEMENT TABLE 580a

| SWITCH | VB# | AVAILABILITY | DIRECTION | MAP | PORT # | VH# | RESOURCE # |
|---|---|---|---|---|---|---|---|
| 300b | 1 | YES | UP | YES | 310b-1 | 0 | (310b-1, #0) |
|  | 2 | YES | DOWN | YES | 320b-1 | 0 | (320b-1, #0) |
|  | 3 | YES | DOWN | YES | 320b-2 | 0 | (320b-2, #0) |
|  | 4 | NO | - | NO | - | - |  |
|  | 5 | NO | - | NO | - | - |  |
|  | 6 | YES | UP | YES | 310b-2 | 0 | (310b-2, #0) |
|  | 7 | YES | DOWN | YES | 320b-3 | 0 | (320b-3, #0) |
|  | 8 | YES | DOWN | YES | 320b-4 | 0 | (320b-4, #0) |
|  | 9 | NO | - | NO | - | - |  |
|  | 10 | NO | - | NO | - | - |  |
| 300a | 1 | YES | UP | YES | 310a-1 | 0 | (310a-1, #0) |
|  | 2 | YES | DOWN | YES | 320a-1 | 0 | (320a-1, #0) |
|  | 3 | YES | DOWN | YES | 320a-2 | 0 | (320a-2, #0) |
|  | 4 | NO | - | NO | - | - |  |
|  | 5 | NO | - | NO | - | - |  |
|  | 6 | NO | - | NO | - | - |  |
|  | 7 | NO | - | NO | - | - |  |
|  | 8 | NO | - | NO | - | - |  |
|  | 9 | NO | - | NO | - | - |  |
|  | 10 | NO | - | NO | - | - |  |

581 582 583 584 585 586 587 588

VIRTUAL SWITCH MANAGEMENT TABLE 520a

| SWITCH | VS# | AVAILABILITY | START VB # | ENTRY COUNT |
|---|---|---|---|---|
| 300b | 0 | NO | - | 0 |
|  | 1 | YES | 1 | 3 |
|  | 2 | YES | 6 | 3 |
|  | 3 | NO | - | 0 |
|  | 4 | NO | - | 0 |
| 300a | 0 | NO | - | 0 |
|  | 1 | YES | 1 | 3 |
|  | 2 | NO | - | 0 |
|  | 3 | NO | - | 0 |
|  | 4 | NO | - | 0 |

| GVH# | HOST | POWER STATE | VIRTUAL SWITCH LIST ||||||| 
|---|---|---|---|---|---|---|---|---|---|
| | | | SWITCH | VS# | SWITCH | VS# | SWITCH | VS# | ... |
| 1 | 100b | OFF | 300b | 1 | 300a | 1 | – | – | ... |
| 2 | 100a | OFF | 300b | 2 | – | – | – | – | ... |

HOST-VIRTUAL SWITCH MANAGEMENT TABLE 560

FIG. 8

| SWITCH | UPSTREAM PORT | HOST | VS# | PREVENTING STATE | UPSTREAM PORT | HOST | VS# | PREVENTING STATE |
|---|---|---|---|---|---|---|---|---|
| 300b | 310b-1 | 100b | #1 | NO | 310b-2 | 100a | #2 | NO |
| 300a | 310a-1 | 100b | #1 | NO | 310a-2 | 100a | – | YES |

LINKUP PREVENTING CONTROL DETERMINING TABLE 590

FIG. 9

| SWITCH | PORT # | DIRECTION | LINK DIRECTION |
|---|---|---|---|
| 300b | 310b-1 | UP | UP |
| | 310b-2 | UP | UP |
| | 330b | UP | UP |
| | 320b-1 | DOWN | DOWN |
| | 320b-2 | DOWN | DOWN |
| | 320b-3 | DOWN | DOWN |
| | 320b-4 | down | DOWN |
| 300a | 310a-1 | UP | UP |
| | 310a-2 | UP | NOT LINKED |
| | 330a | UP | UP |
| | 320a-1 | DOWN | DOWN |
| | 320a-2 | DOWN | DOWN |
| | 320a-3 | DOWN | DOWN |
| | 320a-4 | DOWN | DOWN |

SWITCH PORT CONTROL REGISTER 600

*FIG. 10*

| SET VALUE | MEANING |
|---|---|
| UP | LINKED AS UPSTREAM PORT |
| DOWN | LINKED AS DOWNSTREAM PORT |
| CROSS | LINKED AS BIDIRECTIONAL PORT |
| NOT LINKED | NOT LINKED |

*FIG. 11*

| HOST | ROOT PORT | PWR STATE | PWE LED STATE | ATN LED STATE |
|---|---|---|---|---|
| 100b | 160b-1 | ON | ON | OFF |
| | 160b-2 | ON | ON | OFF |
| 100a | 160a-1 | ON | ON | OFF |
| | 160a-2 | OFF | OFF | OFF |

ROOT PORT HOT-PLUG STATE MANAGEMENT TABLE 610

*FIG. 12*

| | 571 | 572 | 573 | 574 | 575 | 576 |
|---|---|---|---|---|---|---|
| SWITCH | PORT # | DIRECTION | TYPE | LINK DESTINATION | LINK DESTINATION PORT | |
| 300b | 310b-1 | UP | HOST | 100b | 160b-1 |
| | 310b-2 | UP | HOST | 100a | 160a-1 |
| | 330b | UP | PCIM | 250 | – |
| | 320b-1 | DOWN | DEVICE | 420b-1 | – |
| | 320b-2 | DOWN | – | – | – |
| | 320b-3 | DOWN | DEVICE | 420b-3 | – |
| | 320b-4 | DOWN | DEVICE | 420b-4 | – |
| 300a | 310a-1 | UP | HOST | 100b | 160b-2 |
| | 310a-2 | UP | HOST | 100a | 160a-2 |
| | 330a | UP | PCIM | 250 | – |
| | 302a-1 | DOWN | DEVICE | 420a-1 | – |
| | 302a-2 | DOWN | DEVICE | 420a-2 | – |
| | 302a-3 | DOWN | – | – | – |
| | 302a-4 | DOWN | DEVICE | 420a-4 | – |

SWITCH PORT MANAGEMENT TABLE 570b

*FIG. 15*

| HOST | SWITCH | SLOT |
|---|---|---|
| HOST A | MRSW#1 | SLOT#1 |
| | | SLOT#2 |
| | MRSW#2 | SLOT#1 |
| | | SLOT#2 |
| HOST B | MRSW#1 | SLOT#3 |
| | | SLOT#4 |
| | MRSW#2 | SLOT#3 |
| | | SLOT#4 |

HOST-SLOT ALLOCATION TABLE 500c

FIG. 17A

| HOST | SWITCH | SLOT |
|---|---|---|
| 100b | 300b | 320b-1 |
| | | 320b-2 |
| | 300a | 320a-1 |
| | | 320a-2 |
| 100a | 300b | 320b-3 |
| | | 320b-4 |
| | 300a | 320a-3 |
| | | 320a-4 |

HOST-SLOT ALLOCATION TABLE 500d

FIG. 17B

| GVH# | HOST | POWER STATE | VIRTUAL SWITCH LIST ||||||
|---|---|---|---|---|---|---|---|---|
| | | | SWITCH | VS# | SWITCH | VS# | SWITCH | VS# | ... |
| 1 | 100b | ON | 300b | 1 | 300a | 1 | – | – | ... |
| 2 | 100a | ON | 300b | 2 | 300a | – | – | – | ... |

HOST-VIRTUAL SWITCH MANAGEMENT TABLE 560b

FIG. 20

| SWITCH | UPSTREAM PORT | HOST | VS# | PREVENTING STATE | UPSTREAM PORT | HOST | VS# | PREVENTING STATE |
|---|---|---|---|---|---|---|---|---|
| 300b | 310b-1 | 100b | #1 | NO | 310b-2 | 100a | #2 | NO |
| 300a | 310a-1 | 100b | #1 | NO | 310a-2 | 100a | #2 | NO |

LINKUP PREVENTING CONTROL DETERMINING TABLE 590b

FIG. 21

| SWITCH | PORT # | DIRECTION | LINK DIRECTION |
|---|---|---|---|
| 300b | 310b-1 | UP | UP |
| | 310b-2 | UP | UP |
| | 330b | UP | UP |
| | 320b-1 | DOWN | DOWN |
| | 320b-2 | DOWN | DOWN |
| | 320b-3 | DOWN | DOWN |
| | 320b-4 | DOWN | DOWN |
| 300a | 310a-1 | UP | UP |
| | 310a-2 | UP | UP |
| | 330a | UP | UP |
| | 320a-1 | DOWN | DOWN |
| | 320a-2 | DOWN | DOWN |
| | 320a-3 | DOWN | DOWN |
| | 320a-4 | DOWN | DOWN |

601 602 603 604

SWITCH PORT CONTROL REGISTER 600b

*FIG. 22*

| 611 | 612 | 613 | 614 | 615 |
|---|---|---|---|---|
| HOST | ROOT PORT | PWR STATE | PWE LED STATE | ATN LED STATE |
| 100b | 160b-1 | ON | ON | OFF |
|  | 160b-2 | ON | ON | OFF |
| 100a | 160a-1 | ON | ON | OFF |
|  | 160a-2 | OFF→ON | OFF→BLINK→ON | OFF |

ROOT PORT HOT-PLUG STATE MANAGEMENT TABLE 610b

*FIG. 25*

SWITCH POWER STATE MANAGEMENT TABLE 530a

| GVH# | HOST | POWER STATE | VIRTUAL SWITCH LIST ||||||| 
| | | | SWITCH | VS# | SWITCH | VS# | SWITCH | VS# | ... |
| --- | --- | --- | --- | --- | --- | --- | --- | --- | --- |
| 1 | 100b | OFF | 300b | 1 | 300a | 1 | – | – | ... |
| 2 | 100a | ON | 300b | 2 | – | – | – | – | ... |

HOST-VIRTUAL SWITCH MANAGEMENT TABLE 560c

FIG. 29

| SWITCH | POWER STATE | VS# ||||| TOTAL RESULT |
| | | 0 | 1 | 2 | 3 | 4 | |
| --- | --- | --- | --- | --- | --- | --- | --- |
| 300b | OFF | – | OFF | ON | – | – | OFF |
| 300a | OFF | – | OFF | – | – | – | OFF |

SWITCH POWER STATE MANAGEMENT TABLE 530c

FIG. 30

| 561 | 562 | 563 | \multicolumn{6}{c|}{VIRTUAL SWITCH LIST} | |
|---|---|---|---|---|---|---|---|---|
| GVH# | HOST | POWER STATE | SWITCH (565) | VS# (566) | SWITCH | VS# | SWITCH (564) | VS# | |
| 1 | 100b | ON | 300b | 1 | 300a | 1 | - | - | ... |
| 2 | 100a | ON | 300b | 2 | - | - | - | - | ... |

HOST-VIRTUAL SWITCH MANAGEMENT TABLE 560d

FIG. 31

| 531 | 532 | \multicolumn{5}{c|}{533} | 534 |
|---|---|---|---|---|---|---|---|
| | | \multicolumn{5}{c|}{VS#} | |
| SWITCH | POWER STATE | 0 | 1 | 2 | 3 | 4 | TOTAL RESULT |
| 300b | ON | - | ON | ON | - | - | ON |
| 300a | OFF | - | ON | - | - | - | ON |

SWITCH POWER STATE MANAGEMENT TABLE 530d

FIG. 32

| 561 | 562 | 563 | 565 | 566 | 564 | | | | |
|---|---|---|---|---|---|---|---|---|---|
| GVH# | HOST | POWER STATE | VIRTUAL SWITCH LIST | | | | | | |
| | | | SWITCH | VS# | SWITCH | VS# | SWITCH | VS# | ... |
| 1 | 100b | OFF | 300b | 1 | 300a | 1 | – | – | ... |
| 2 | 100a | ON | 300b | 2 | – | – | – | – | ... |

HOST-VIRTUAL SWITCH MANAGEMENT TABLE 560e

FIG. 34

| 531 | 532 | 533 | | | | | 534 |
|---|---|---|---|---|---|---|---|
| SWITCH | POWER STATE | VS# | | | | | TOTAL RESULT |
| | | 0 | 1 | 2 | 3 | 4 | |
| 300b | ON | - | OFF | ON | - | - | ON |
| 300a | ON | - | OFF | - | - | - | OFF |

SWITCH POWER STATE MANAGEMENT TABLE 530e

FIG. 35

| GVH# | HOST | POWER STATE | VIRTUAL SWITCH LIST | | | | | | |
|---|---|---|---|---|---|---|---|---|---|
| | | | SWITCH | VS# | SWITCH | VS# | SWITCH | VS# | ... |
| 1 | 100b | OFF | 300b | 1 | 300a | 1 | – | – | ... |
| 2 | 100a | OFF | 300b | 2 | – | – | – | – | ... |

HOST-VIRTUAL SWITCH MANAGEMENT TABLE 560f

FIG. 36

| SWITCH | POWER STATE | VS# | | | | | TOTAL RESULT |
|---|---|---|---|---|---|---|---|
| | | 0 | 1 | 2 | 3 | 4 | |
| 300b | ON | - | OFF | OFF | - | - | OFF |
| 300a | OFF | - | OFF | - | - | - | OFF |

SWITCH POWER STATE MANAGEMENT TABLE 530f

FIG. 37

| GVH# | HOST | POWER STATE | VIRTUAL SWITCH LIST ||||||
|------|------|-------------|--------|-----|--------|-----|--------|-----|
|      |      |             | SWITCH | VS# | SWITCH | VS# | SWITCH | VS# | ... |
| 1 | 100b | OFF | 300b | 1 | 300a | 1 | – | – | ... |
| 2 | 100a | ON  | 300b | 2 | 300a | 2 | – | – | ... |

HOST-VIRTUAL SWITCH MANAGEMENT TABLE 560g

FIG. 39

| SWITCH | POWER STATE | VS# |||||  TOTAL RESULT |
|--------|-------------|---|---|---|---|---|------|
|        |             | 0 | 1 | 2 | 3 | 4 |      |
| 300b | ON  | - | OFF | ON | - | - | OFF |
| 300a | OFF | - | OFF | ON | - | - | ON  |

SWITCH POWER STATE MANAGEMENT TABLE 530g

FIG. 40

| 561 | 562 | 563 | VIRTUAL SWITCH LIST 565 566 564 | | | | | |
|---|---|---|---|---|---|---|---|---|
| GVH# | HOST | POWER STATE | SWITCH | VS# | SWITCH | VS# | SWITCH | VS# | ... |
| 1 | 100b | OFF | 300b | 1 | 300a | 1 | - | - | ... |
| 2 | 100a | ON | 300b | 2 | - | - | - | - | ... |

HOST-VIRTUAL SWITCH MANAGEMENT TABLE 560h

FIG. 43

| SWITCH 531 | POWER STATE 532 | VS# 533 | | | | | TOTAL RESULT 534 |
|---|---|---|---|---|---|---|---|
| | | 0 | 1 | 2 | 3 | 4 | |
| 300b | ON | - | OFF | ON | - | - | OFF |
| 300a | ON | - | OFF | - | - | - | OFF |

SWITCH POWER STATE MANAGEMENT TABLE 530h

FIG. 44

COMPUTER SYSTEM, METHOD OF MANAGING PCI SWITCH, AND MANAGEMENT SERVER

CLAIM OF PRIORITY

The present application claims priority from Japanese patent application JP2009-036962 filed on Feb. 19, 2009, the content of which is hereby incorporated by reference into this application.

BACKGROUND OF THE INVENTION

This invention relates to a computer system, a management method, and a server. More particularly, this invention relates to a computer system that manages a PCI switch.

In recent years, blade servers which include a plurality of computers in a single machine have been put into use in order to facilitate server management. Further, improvement in processing performance of CPUs brought about by a multi-core technology, which gives a CPU a plurality of processor cores, has led to widespread use of a virtual server technology, which uses a CPU efficiently by running a plurality of virtual servers on a single computer.

While the CPU performance has improved, there has been a shortage of I/O devices which require connectors and ports for input and output. The shortage of I/O devices can be improved by enhancing the extensibility and flexibility of I/O devices with the use of a PCI switch technology.

Hot-plug is a technology known to enhance the flexibility of I/O devices by dynamically changing the I/O device configuration after the server is booted up. The PCI Express standard defined by the PCI-SIG lays down the register specifications and the like of hot-plug controllers which control hot-plug. Any OS that supports PCI Express hot-plug can employ hot-plug irrespective of the type of I/O devices.

If a pseudo device is prepared within a PCI switch in anticipation of the future use of PCI hot-plug and a resource for an I/O device is reserved upon booting up of the server, the mechanism of hot-plug can be utilized when the I/O device is actually added to reconfigure the I/O device configuration dynamically as described in, for example, JP 2008-046722 A.

The PCI-SIG also defines a multi-root PCI switch technology, which extends a PCI switch used by a conventional single server such that a plurality of computers are connected to a plurality of peripheral component interconnect (PCI) devices (or PCIe(xpress) devices) which are I/O devices as described in, for example, an online document "Multi-Root I/O Virtualization and Sharing Specification Revision 1.0" published by PCI-SIG in May 2008 and retrieved on Jan. 6, 2009 at PCI-SIG web site, http:// . . . /specifications/iov/multi-root/.

SUMMARY OF THE INVENTION

To follow the regulations on hot-plug of the PCI Express standard, a hot-plug controller (downstream bridge in the case of a switch) needs to be prepared in association with a slot that may employ hot-plug. In PCI Express where buses and devices basically have a one-on-one relation, hot-plug controllers are present only on the downstream bridge side and accordingly bridges need to be prepared on a slot basis in advance. The above-mentioned conventional technology which reserves in advance a resource for an I/O device that may employ hot-plug in the future only needs to prepare as many resources as the number of slots, and therefore is a practical solution in the case where a PCI switch is used by a single host.

In the case of a multi-root PCI switch which may be shared among a plurality of hosts, on the other hand, the number of resources that need to be prepared is the product of the total number of hosts sharing the multi-root PCI switch and the total number of devices that may be connected to its slots.

For example, in the case of a multi-root PCI switch that has eight upstream ports and eight downstream ports, resources need to be prepared for 8×8=64 downstream bridges and hot-plug controllers each associated with one of the downstream bridges.

In the case of multi-root PCI switches having a cascade configuration, the number of hosts that may use their slots is even larger. For example, when there are two stages of multi-root PCI switches each having eight upstream ports and eight downstream ports, 8×8=64 hosts at maximum are connected to the slots of the second stage multi-root PCI switch and, in all multi-root PCI switches combined, resources need to be reserved for 64×8=512 downstream bridges and hot-plug controllers each associated with one of the downstream bridges.

The upper limit to the number of hosts that can share a single I/O device is fixed in actual I/O devices, which means that resources reserved for the maximum number of hosts that may be connected are never used all at once. Therefore, the following problem arises with the above-mentioned technology, which reserves in advance resources in a number based on the number of I/O devices that may employ hot-plug in the future and prepares all resources that may be connected dynamically. The above-mentioned technology causes an increase in size of an LSI that constitutes a multi-root PCI switch and a rise in cost.

This invention has been made in view of the problem described above, and it is therefore an object of this invention to share an I/O device among a plurality of hosts while preventing resources such as LSIs that are prepared in a multi-root PCI switch from increasing in number.

A representative aspect of this invention is as follows. That is, there is provided a computer system including: at least one of a plurality of computers each comprising processors, memories and interfaces; at least one of PCI switches each comprising first ports and second ports; I/O devices each coupled to each of the PCI switches; a switch management module for managing a configuration of each of the PCI switches; and a power control module which is coupled to the plurality of computers to control powering on and off of the plurality of computers. Each of the first ports is coupled to one of the interfaces of each of the plurality of computers. Each of the second ports is coupled to one of the I/O devices. The switch management module includes an identifying module for identifying a first port coupled to one of the plurality of computers that is to be booted up, and notifying one of the PCI switches of the identified first port, an instruction module for instructing the power control module to boot up the one of the plurality of computers coupled to the identified first port, and an allocation management module for managing allocation of one of the I/O devices to the one of the plurality of computers, and notifying the one of the PCI switches of the allocation of the one of the I/O devices to the one of the plurality of computers after the one of the plurality of computers is booted up. The each of the PCI switches further includes a preventing control module for preventing the one of the plurality of computers from detecting a configuration of the identified first port based on a result of the identification of the identified first port, and a virtual switch generating module for generating a virtual switch that couples the identified first port and one of the second ports based on the notification of the allocation from the allocation management module.

The embodiment of this invention makes it possible to allocate the resource of the PCI switch only when the need for the I/O device arises, thereby keeping the amount of resource prepared in the PCI switch small.

BRIEF DESCRIPTION OF THE DRAWINGS

The present invention can be appreciated by the description which follows in conjunction with the following figures, wherein:

FIG. 3A is an explanatory diagram illustrating one example of a host-slot allocation table which reflects an initial state of the first and second embodiments;

FIG. 3B is an explanatory diagram illustrating an another example of the host-slot allocation table which reflects an initial state of the first and second embodiments;

FIG. 5 is an explanatory diagram illustrating a switch port management table according to the first embodiment;

FIG. 7 is an explanatory diagram illustrating a relation between a virtual switch management table and a virtual bridge management table according to the first embodiment;

FIG. 8 is an explanatory diagram illustrating a host-virtual switch management table according to the first embodiment;

FIG. 9 is an explanatory diagram illustrating a linkup preventing control determining table according to the first embodiment;

FIG. 10 is an explanatory diagram illustrating a switch port control register according to the first embodiment;

FIG. 11 is an explanatory diagram illustrating values that the link direction can have according to the first embodiment;

FIG. 12 is an explanatory diagram illustrating a root port hot-plug state management table according to the first embodiment;

FIG. 15 is an explanatory diagram illustrating the switch port management table, which reflects the computer system after the I/O devices are added to the slots according to the first embodiment;

FIG. 17A is an explanatory diagram illustrating one example of the host-slot allocation table according to the first embodiment;

FIG. 17B is an explanatory diagram illustrating an another example of the host-slot allocation table according to the first embodiment;

FIG. 20 is an explanatory diagram illustrating the host-virtual switch management table, which reflects the computer system after the slots are allocated to one of the hosts according to the first embodiment;

FIG. 21 is an explanatory diagram illustrating the linkup preventing control determining table, which reflects the computer system after a slot is allocated to a host according to the first embodiment;

FIG. 22 is an explanatory diagram illustrating the switch port control register, which reflects the computer system after the slots are allocated to one of the hosts according to the first embodiment;

FIG. 25 is an explanatory diagram illustrating the root port hot-plug state management table according to the first embodiment;

FIG. 29 is an explanatory diagram illustrating a host-virtual switch management table according to the second embodiment;

FIG. 30 is an explanatory diagram illustrating the switch power state management table according to the second embodiment;

FIG. 31 is an explanatory diagram illustrating the host-virtual switch management table according to the second embodiment;

FIG. 32 is an explanatory diagram illustrating the switch power state management table according to the second embodiment;

FIG. 34 is an explanatory diagram of the host-virtual switch management table according to the second embodiment;

FIG. 35 is an explanatory diagram of the switch power state management table according to the second embodiment;

FIG. 36 is an explanatory diagram of the host-virtual switch management table according to the second embodiment;

FIG. 37 is an explanatory diagram illustrating the switch power state management table according to the second embodiment;

FIG. 39 is an explanatory diagram illustrating the host-virtual switch management table according to the third embodiment;

FIG. 40 is an explanatory diagram illustrating the switch power state management table according to the third embodiment;

FIG. 43 is an explanatory diagram illustrating the host-virtual switch management table according to the third embodiment;

FIG. 44 is an explanatory diagram illustrating the switch power state management table according to the third embodiment;

DETAILED DESCRIPTION OF THE PREFERRED EMBODIMENTS

Embodiments of this invention are described below referring to the accompanying drawings.

First Embodiment

[Configuration]

Figure 1:
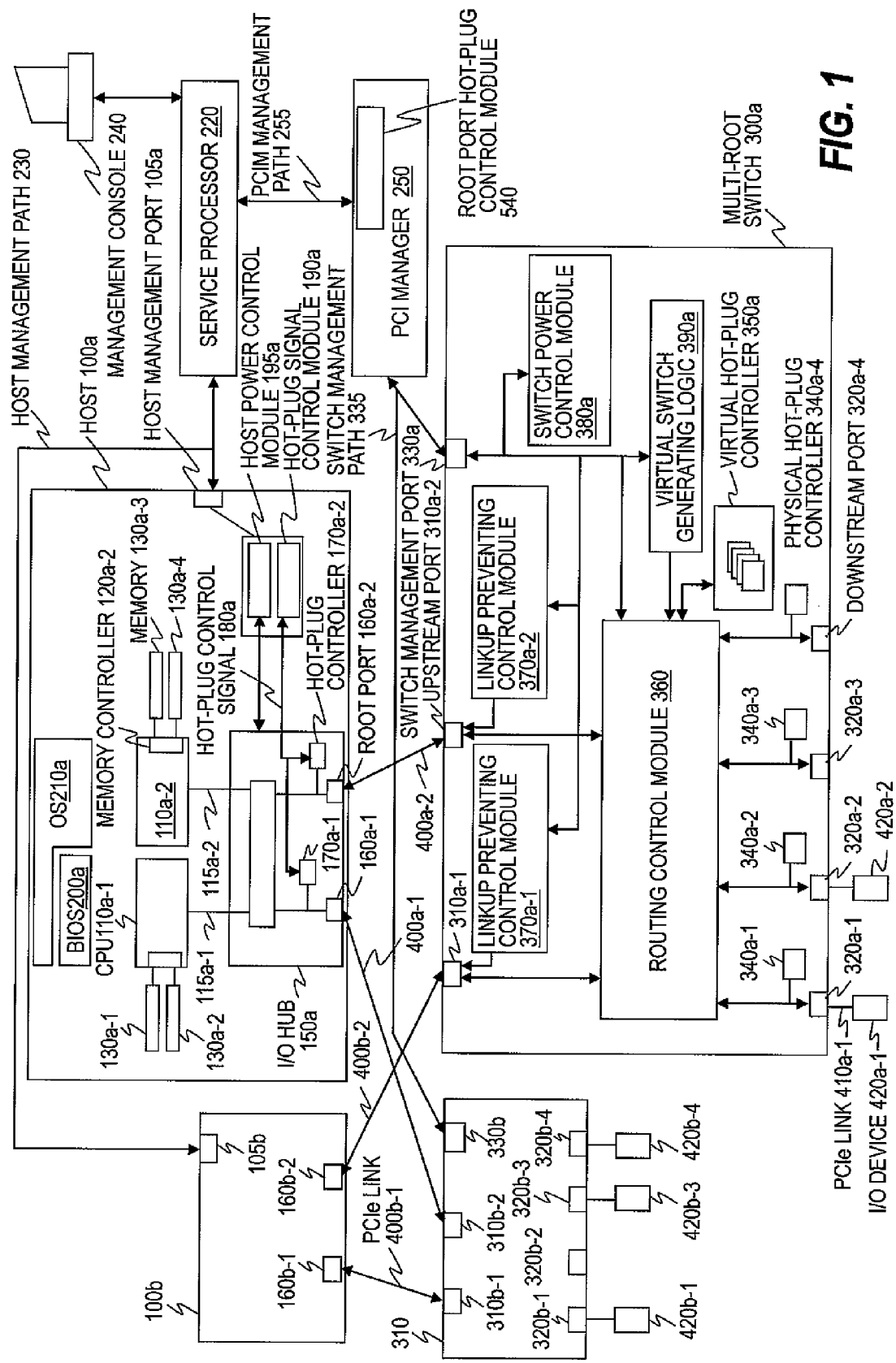
FIG. 1 is a block diagram illustrating a configuration of a computer system according to first and second embodiments of this invention.

FIG. 1 is a block diagram illustrating the configuration of a computer system according to first and second embodiments of this invention.

The computer system of the first embodiment includes hosts 100a and 100b, I/O devices 420a-1 and 420a-2 which are used by the host 100a, and I/O devices 420b-1, 420b-3 and 420b-4, which are used by the host 100b, multi-root switches 300a and 300b, the multi-root switch 300a connecting the hosts 100a and 100b to the I/O devices 420a-1 and 420a-2, the multi-root switch 300b connecting the hosts 100a and 100b to I/O devices 420b-1, 420b-3 and 420b-4, a PCI manager 250 (management server), which manages the multi-root switches 300a and 300b, and a service processor 220, which manages the hosts 100a and 100b. The service processor 220 has a function of relaying communication of the hosts 100a and 100b to and from the PCI manager 250. Alternatively, a network connecting the hosts 100a and 100b to and from the PCI manager 250 may be provided.

The hosts 100a and 100b are computers that have the same configuration. Described below is the configuration of the host 100a and a description on the other computer is omitted. The hosts 100a and 100b are collectively referred to as host(s) 100. The collective term for the multi-root switches 300a and 300b is "multi-root switch(es) 300". Similarly, the collective term for the I/O devices 420a-1, 420a-2, and 420b-1, 420b-3 and 420b-4 is "I/O device(s) 420".

The host 100a includes CPUs (processors) 110a-1 and 110a-2, which perform computing, memories 130a-1 to 130a-4, which store data and commands, an I/O hub 150a, which is connected to the CPUs 110 via CPU connection buses 115a-1 and 115a-2, and a host management port 105a, which is an interface for connecting to the service processor 220. The collective term for the memories 130a-1 to 130a-4 is "the memories 130". The collective term for the CPUs 110a-1 and 110a-2 is "the CPUs 110".

In FIG. 1, the memories 130 are connected to the CPUs 110 via memory controllers 120, which are installed in the CPUs 110. The host(s) 100 may instead be configured to have the memory controllers 120 outside the CPUs 110 (in a chipset called a northbridge). Which of the two configurations is employed does not make a difference in embodiments of this invention. Further, the plurality of CPUs 100 may be interconnected by the CPU connection bus 115.

After the computer system is booted up, an OS 210a and a BIOS 200a are loaded onto the memories 130 by the CPUs 110 to be executed when the CPUs 110 refer to the memories 130. The BIOS 200a may be read by the CPUs 110 directly from a ROM (not shown) or the like, instead of being loaded onto the memories 130. The OS 210a can be stored in storage that is a storage medium connected to a host bus adapter.

The I/O hub 150a is equipped with a function of a root complex, which serves as the root of a PCI switch in PCI Express, and includes root ports 160a-1 and 160a-2 as interfaces for connecting to the multi-root switches 300a and 300b. The I/O hub 150a functions as an interface for establishing communication between the CPUs 110 and the multi-root switches 300.

The host 100a accesses via those root ports 160a-1 and 160a-2 the I/O devices 420a-1 and 420a-2 and the I/O devices 420b-1 to 420b-4, which are connected to at least one of the multi-root switches 300a and 300b, respectively. The collective term for the root ports 160a-1 and 160a-2 of the host 100a and for root ports 160b-1 and 160b-2 of the host 100b is "root port 160".

The I/O devices 420 may be constituted of host bus adapters (HBAs) or network interface cards (NICs).

The I/O hub 150a includes hot-plug controllers 170a-1 and 170a-2, which control hot-plug, in association with the two root ports 160. The collective term for the hot-plug controllers 170a-1 and 170a-2 is "hot-plug controller 170".

Hot-plug control signals 180a of the hot-plug controllers 170a-1 and 170a-2 are usually connected to I/O slots to which the root ports 160a are connected. In the embodiments of this invention, however, the root ports 160 are connected to the multi-root switches 300 instead of I/O slots.

The hot-plug control signals 180a of the hot-plug controllers 170 are connected to a hot-plug signal control module 190a of the host 100a and, via the host management port 105a, connected to the service processor 220.

<Service Processor 220>

The service processor 220 is a computer that monitors the state of power supply of the host(s) 100 and controls the powering on and off of the host(s) 100. The service processor 220 is connected to a management console 240 through which a user or a system administrator inputs and outputs information. The service processor 220 may include the management console 240. The PCI manager 250 can obtain the state of power supply of the host(s) 100 from the service processor 220, thus obtaining the state of the host(s) 100, such as booting completed or shutdown completed.

The service processor 220 includes a processor and a memory (not shown). The service processor 220 is connected to the hosts 100a and 100b via host management paths 230 (network). The service processor 220 is also connected to the PCI manager 250 via a PCIM (PCI manager) management path 255 (second network).

When an instruction to power on the host 100a is given from the management console 240, the service processor 220 first makes an inquiry to the PCI manager 250 about whether or not a virtual switch capable of reaching the I/O device 420 that is used by the host 100*a* has been set in the multi-root switches 300.

In the case where the virtual switch needs to be established, the PCI manager 250 establishes the virtual switch in the relevant multi-root switch 300 and sends a response to the service processor 220. When the response is received from the PCI manager 250, the service processor 220 sends an instruction to power on a host power control module 195*a* of the host 100*a*, to thereby power on the host 100*a*.

<Multi-Root Switches 300>

The multi-root switches 300*a* and 300*b* include multi-root PCI switches that conform to the PCI Express and multi-root I/O virtualization (MR-IOV) standards as in the related art described above. The multi-root switches 300 connect a plurality of host(s) 100 (here, 100*a* and 100*b*) and a plurality of I/O devices 420 (here, 420*a*-1, 420*a*-2, and 420*b*-1 to 420*b*-4).

The multi-root switches 300*a* and 300*b* have the same configuration. The following description therefore deals with the multi-root switch 300*a* alone and a description on the multi-root switch 300*b* is omitted The multi-root switch 300*a* includes an upstream port 310*a*-2, which is connected to the root port 160*a*-2 of the host 100*a*, an upstream port 310*a*-1, which are connected to the root port 160*b*-2 of the host 100*b*, downstream ports 320*a*-1 to 320*a*-4, which are connected to the I/O devices 420, a virtual switch generating logic 390*a*, which sets communication paths of the upstream ports 310*a*-1 and 310*a*-2 and the downstream ports 320*a*-1 to 320*a*-4, and a routing control module 360, which routes packets along the set communication paths.

In the following description, "upstream port 310" is used as the collective term for the upstream ports 310*a*-1 and 310*a*-2 and "downstream port 320" is used as the collective term for the downstream ports 320*a*-1 to 320*a*-4.

The downstream ports 320 may also be referred to as slots 320 because the downstream ports 320 and slots to which the I/O devices 420 are connected have a one-on-one relation in PCI Express.

The virtual switch generating logic 390*a* sets a path over which one of the upstream ports 310 and one of the downstream ports 320 communicate with each other (virtual path) upon instruction from the PCI manager 250 as described later. For that purpose, the virtual switch generating logic 390*a* includes a controller having a management table which is described later.

The multi-root switch 300*a* and the multi-root switch 300*b* respectively include a switch management port 330*a* and a switch management port 330*b* which are for connecting to the PCI manager 250 via a switch management path 335. The PCI manager 250 is connected directly to the switch management ports 330*a* and 330*b* in FIG. 1, but may instead be connected to the switch management ports 330*a* and 330*b* via one of the multi-root switches 300 in a daisy chain.

The multi-root switch 300*a* connects one of the upstream ports 310 and one of the downstream ports 320 to each other with a virtual path which is created by connecting a virtual switch and a virtual bridge, and thus allows the upstream port 310 and the downstream port 320 to communicate the respective input signals.

A virtual bridge connects one of the upstream ports 310 and/or one of the downstream ports 320 each of which is a physical port to a virtual switch, and connects one virtual switch to another virtual switch. A virtual switch and a virtual bridge constitute a virtual path, which can be changed dynamically by the virtual switch generating logic 390*a*. An arbitrary virtual switch can be set as a communication path between one of the upstream ports 310 and one of the downstream ports 320 upon instruction from the PCI manager 250 to the multi-root switch 300*a* to set a virtual switch. Details of the virtual switch generating logic 390*a* are described later.

The downstream ports 320*a*-1 to 320*a*-4 include physical hot-plug controllers 340*a*-1 to 340*a*-4, respectively. The upstream ports 310*a*-1 and 310*a*-2 include linkup preventing control modules 370*a*-1 and 370*a*-2, respectively.

The linkup preventing control modules 370*a*-1 and 370*a*-2 prevent linkup of the upstream ports 310*a*-1 and 310*a*-2 upon instruction from the PCI manager 250, and make it look like no active links are connected to the root ports 160.

<PCI Manager 250>

The PCI manager 250 is a computer including a processor and a memory, and acts as a switch management computer which manages the configuration of the multi-root switches 300*a* and 300*b*. The PCI manager 250 includes various tables (described later) and a root port hot-plug control module 540. The tables are used to manage paths (virtual paths) over which the upstream ports 310 and downstream ports 320 of the multi-root switches 300*a* and 300*b* communicate with each other in accordance with an instruction received from the management console 240 of the service processor 220 via the PCIM management path 255. The root port hot-plug control module 540 sends a control signal for the hot-plug controllers 170 of the host(s) 100 via the service processor 220. What follows is a description on details of the PCI manager 250.

Figure 2:
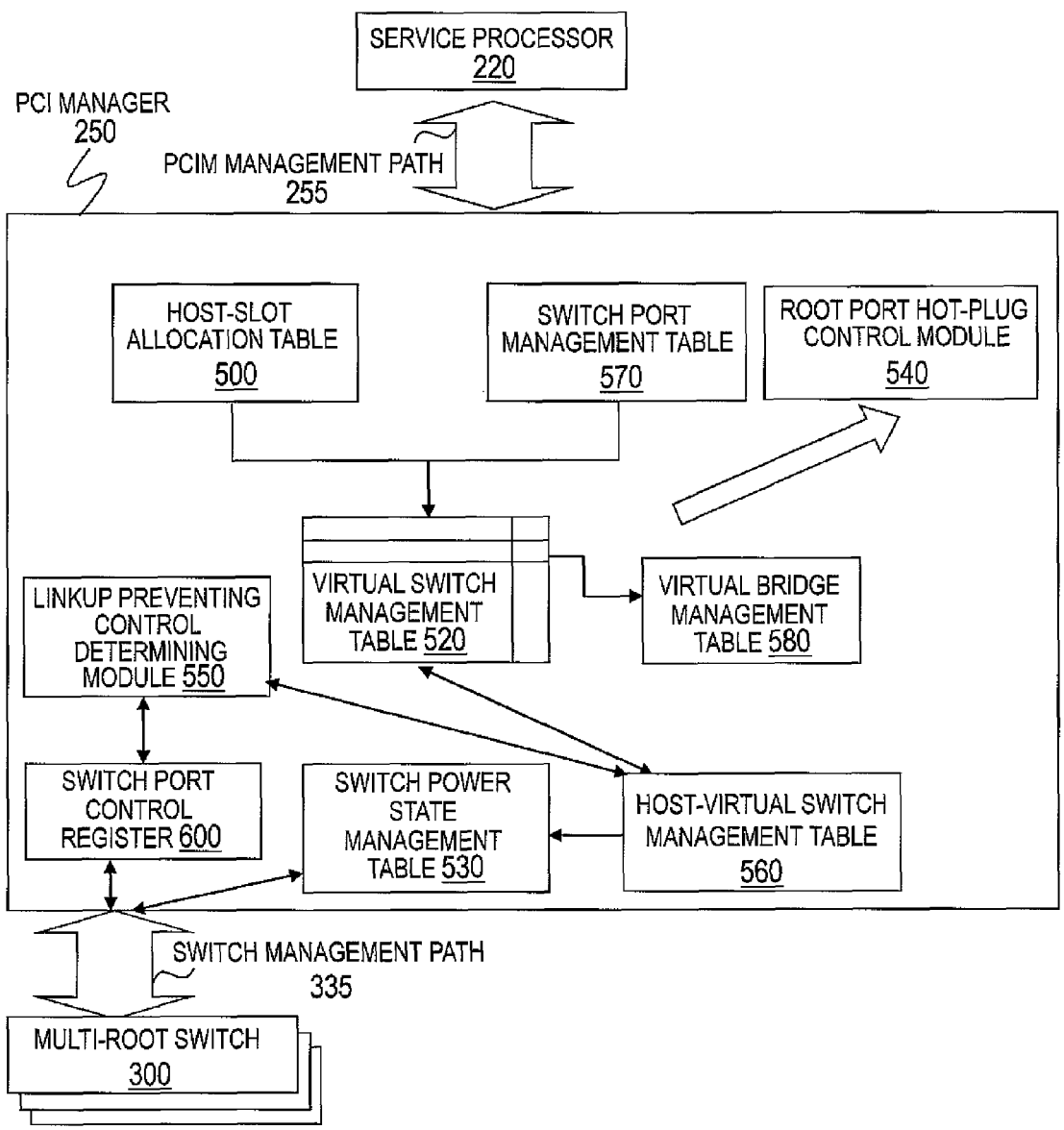
FIG. 2 is a block diagram illustrating functional elements of a PCI manager according to the first embodiment.

FIG. 2 is a block diagram illustrating functional elements of the PCI manager 250 according to the first embodiment.

The PCI manager 250 includes a host-slot allocation table 500, which is set by the user or the system administrator with the management console 240, a switch port management table 570, which shows the configuration of connections between the multi-root switches 300, a virtual switch management table 520 and a virtual bridge management table 580, which show information on virtual switches set in the respective multi-root switches 300, a host-virtual switch management table 560, which shows the association between a virtual switch and the host 100 that uses the virtual switch, a switch power state management table 530, which is used to manage the power on/off state of the respective multi-root switches 300, and a linkup preventing control determining module 550, which enables the linkup preventing function of the multi-root switches 300.

Figure 46:
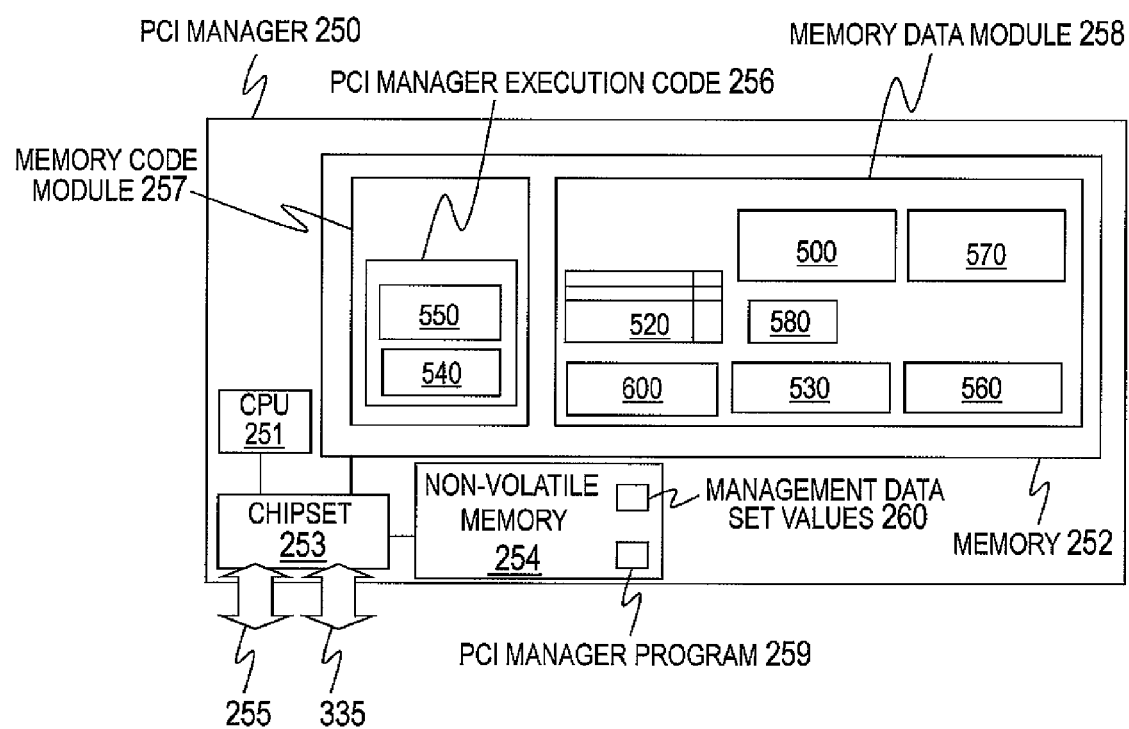
FIG. 46 is a block diagram illustrating the configuration of the PCI manager according to the first embodiment.

FIG. 46 is a block diagram illustrating the configuration of the PCI manager according to the first embodiment.

FIG. 46 illustrates the relation between the hardware configuration of the PCI manager 250 and the functional elements illustrated in FIG. 2.

The PCI manager 250 is a computer including a CPU 251, a memory 252, and a chipset 253. The PCI manager 250 includes the PCIM management path 255, which communicates as an external interface with the service processor 220, the switch management path 335, which manages the multi-root switches 300, and a non-volatile memory 254.

The non-volatile memory 254 stores a PCI manager program 259 executed by the PCI manager 250. The PCI manager 250 deploys the PCI manager program 259 on the memory 252, and the CPU 251 executes the PCI manager program 259. The non-volatile memory 254 may be a hard disk or other similar types of storage.

The memory 252 is configured to include a memory code module 257 and a memory data module 258. The memory code module 257 is configured to include a PCI manager execution code 256, which includes the linkup preventing control determining module 550 and the root port hot-plug control module 540. The memory data module 258 is configured to include the host-slot allocation table 500, the virtual switch management table 520, the switch power state management table 530, the host-virtual switch management table 560, the switch port management table 570, the virtual bridge management table 580, and a switch port control register 600. Set values of these management tables are stored in the non-volatile memory 254 of the PCI manager 250 or in external management storage, and used when deployed on the memory 252 as the need arises.

An example of how the PCI manager 250 sets the allocation of the slots 320 to the host(s) 100 is illustrated in FIGS. 3A and 3B and FIGS. 4A and 4B.

FIG. 3A is an explanatory diagram illustrating one example of a host-slot allocation table 500a which reflects an initial state of the first and second embodiments.

FIG. 3B is an explanatory diagram illustrating an another example of a host-slot allocation table 500b which reflects an initial state of the first and second embodiments.

The host-slot allocation table 500a of FIG. 3A and the host-slot allocation table 500b of FIG. 3B show the association relation between the host(s) 100 and the slots 320.

The host-slot allocation tables 500a and 500b each include a host 501, which indicates the name of one of the hosts 100, a switch 502, which indicates the name of one of the multi-root switches 300, and a slot 503, which indicates the name of one of the downstream ports 320.

Figure 4A:
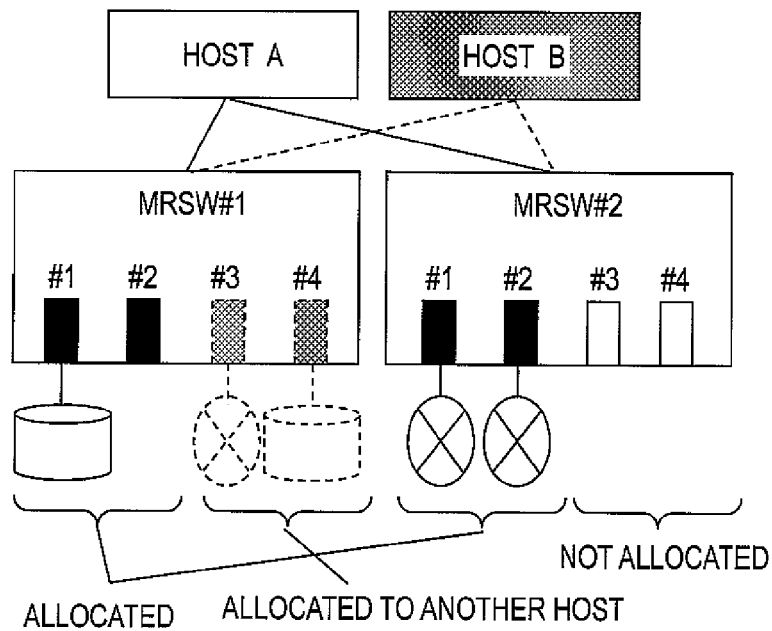
FIGS. 4A and 4B are explanatory diagrams each illustrating a GUI screen on which the allocation of slots to hosts is set according to the first and second embodiments.
Figure 4B:
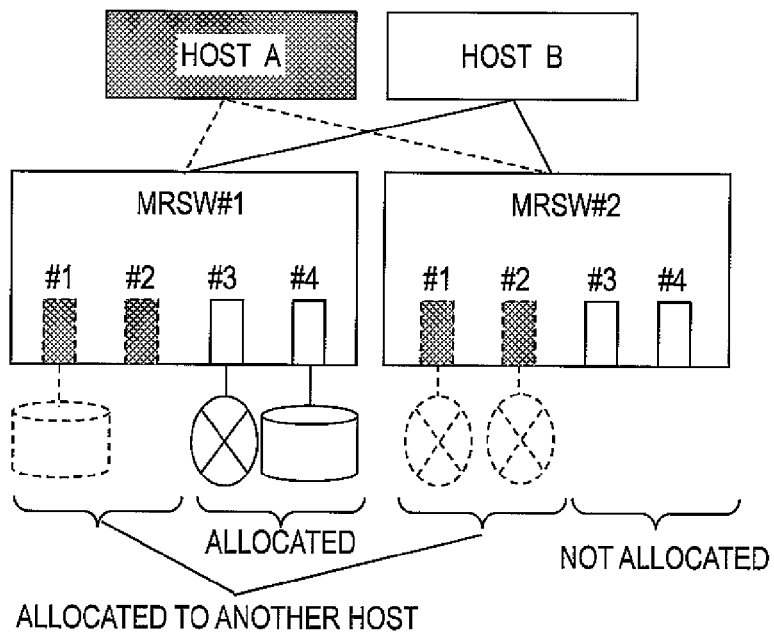

When the PCI manager 250 allocates the slots 320 to the hosts 100 as illustrated in the host-slot allocation table 500a of FIG. 3A, a GUI screen that displays the allocation of the slots 320 to the hosts 100 on the management console 240 is as illustrated in FIGS. 4A and 4B.

FIGS. 4A and 4B are explanatory diagrams each illustrating a GUI screen on which the allocation of the slots 320 to the hosts 100 is set according to the first and second embodiments.

The GUI screen of FIG. 4A displays which slots 320 are allocated to a host A when the allocation of the slots 320 to the hosts 100 is established in accordance with the host-slot allocation table 500a of FIG. 3A. In FIGS. 4A and 4B, "MRSW" represents the multi-root switches 300, and "#1" to "#4" are numbers assigned to the slots 320.

The slots #1 and #2 of the MRSW #1 and the slots #1 and #2 of the MRSW #2 in FIG. 4A are the slots 320 that are already allocated to the host A, and accordingly displayed in solid line with the inside painted black. The slots #3 and #4 of the MRSW #1 are the slots 320 that are already allocated to a host B and are not available for the allocation to the host A, and accordingly displayed in broken line with the inside painted light gray. In this state, the user or the system administrator cannot choose the slots #3 and #4 of the MRSW #1.

The slots #3 and #4 of the MRSW #2 are not allocated to any of the hosts 100 yet, and accordingly displayed without colored.

A slot 320 displayed on the GUI screen of FIG. 4A indicates one of a state in which the slot 320 is not allocated to any of the hosts 100 and a state in which the slot 320 is already allocated to one of the hosts 100. The displayed allocation state is changed by the user or the system administrator. The screen displaying the slot 320 that is not allocated to any of the hosts 100 and the slot 320 that is allocated to one of the hosts 100 may have a toggle key function. The user or the system administrator may click on the displayed slots 320 or manipulate the displayed slots 320 otherwise to change the allocation state.

Similarly to the GUI screen of FIG. 4A, the GUI screen of FIG. 4B displays which slots 320 are allocated to the host B when the allocation of the slots 320 to the hosts 100 is set in accordance with the host-slot allocation table 500a of FIG. 3A.

In FIG. 4B, the slots #3 and #4 of the MRSW #1 which are the slots 320 that are already allocated to the host B are displayed in a manner reverse to the allocation state of the corresponding slots 320 of FIG. 4A, and displayed in solid line with the inside painted black. The slots #1 and #2 of the MRSW #1 and the slots #1 and #2 of the MRSW #2 which are allocated to the host A are displayed in broken line with the inside painted light gray in FIG. 4B. In FIG. 4B, the user or the system administrator cannot choose the slots #1 and #2 of the MRSW #1 and the slots #1 and #2 of the MRSW #2.

The slots #3 and #4 of the MRSW #2 are not allocated to any of the hosts 100 yet, and accordingly displayed without colored.

A slot displayed on the GUI screen of FIG. 4B is one of the slot 320 that is not allocated to any of the hosts 100 and the slot 320 that is already allocated to one of the hosts 100 as in FIG. 4A. The displayed allocation state is changed by the user or the system administrator.

When the user or the system administrator sets the allocation of the slots 320 to the hosts 100 with the use of the GUI screen illustrated in FIGS. 4A and 4B, the host-slot allocation table 500a of FIG. 3A is updated in accordance with the settings set on the GUI screen, and the update is notified to the PCI manager 250.

The host-slot allocation table 500a of FIG. 3A uses host names and slot numbers that are easily recognizable to the user or the system administrator. When the host-slot allocation table 500a is stored in the PCI manager 250, however, the host names and the slot numbers are converted into identifiers easy for the PCI manager 250 to manage (host-slot allocation table 500b).

FIG. 5 is an explanatory diagram illustrating the switch port management table 570 according to the first embodiment.

The switch port management table 570 of FIG. 5 is used by the PCI manager 250 to manage the connection relation (topology) between the multi-root switches 300a and 300b.

The switch port management table 570 includes a switch 571, a port 572, a direction 573, a type 574, a link destination 575, and a link destination port 576.

The switch 571 indicates the identifier of one of the multi-root switches 300. The port 572 indicates one of the upstream ports 310, one of the downstream ports 320, or one of the switch management ports 330.

The direction 573 indicates for each port indicated by the port 572 a direction in which the port communicates, with the switch 571 and the port 572 as keys. The type 574 indicates for each port indicated by the port 572 the type of a component to which the port is connected. The link destination 575 indicates the identifier of a component to which a switch indicated by the switch 571 is connected. The link destination port 576 indicates the identifier of a port connected to a switch indicated by the switch 571 when the component to which the switch indicated by the switch 571 is connected is one of the hosts 100 or one of the multi-root switches 300.

The switch port management table 570 is created by the PCI manager 250 with the use of a procedure called topology detection described in, for example, the online document "Multi-Root I/O Virtualization and Sharing 1.0 Specification".

The switch port management table 570 of FIG. 5 shows the device relation of the respective ports connected to the hosts

100*a* and 100*b* and the multi-root switches 300*a* and 300*b* in the initial configuration state of the first embodiment illustrated in FIG. 1.

<Virtual Switches 430>

Figure 6:
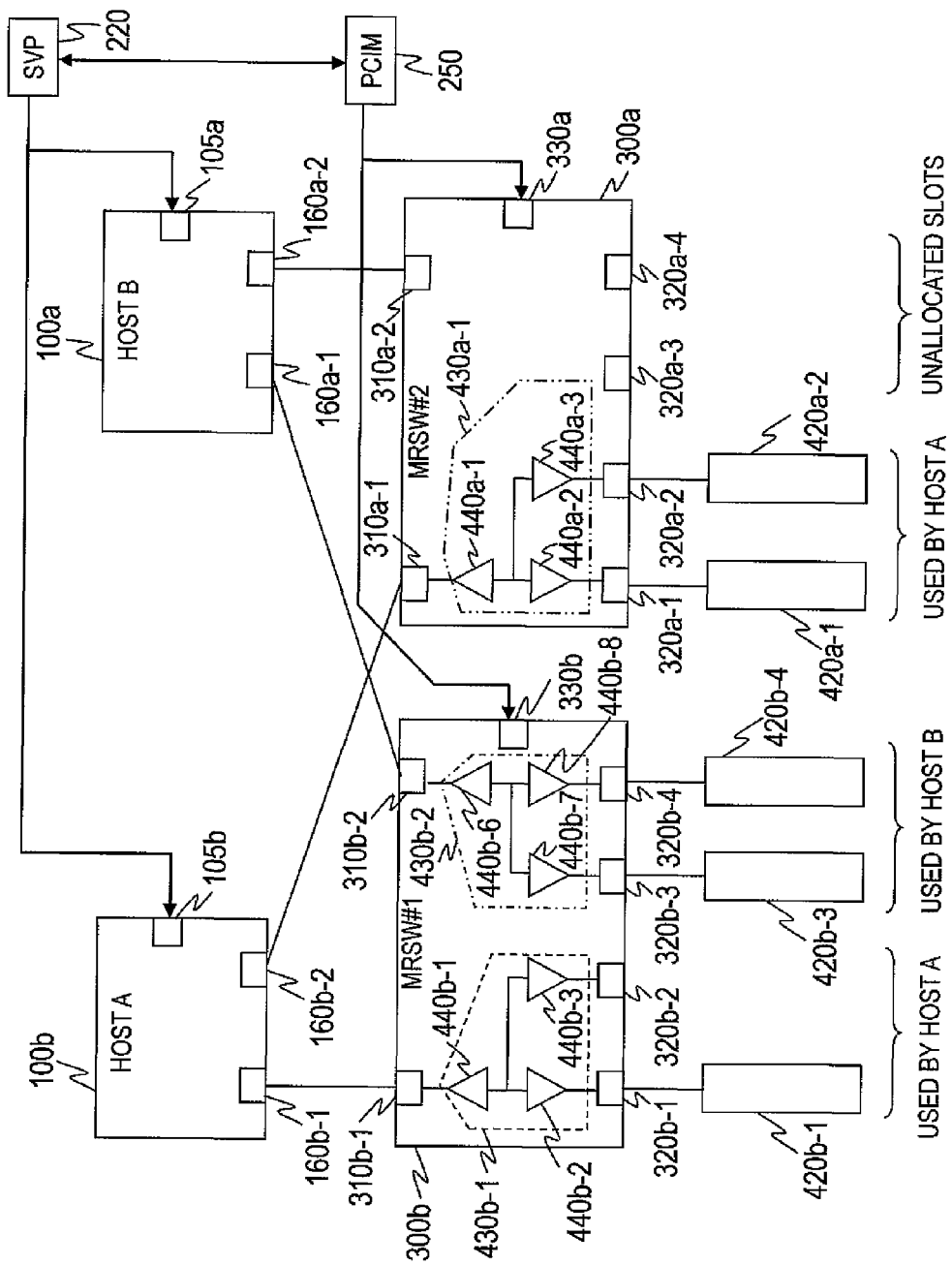
FIG. 6 is a block diagram illustrating configurations of virtual switches and virtual bridges according to the first embodiment.

FIG. 6 is a block diagram illustrating the configurations of the virtual switches 430 and virtual bridges 440 according to the first embodiment.

FIG. 6 schematically illustrates the configurations of the virtual switches 430 and the virtual bridges 440 that are included in the multi-root switches 300 when slots 320 are allocated to hosts 100 as shown in the host-slot allocation table 500*a* of FIG. 3A.

Each virtual switches 430 (for example, 430*a*-1) includes a combination of one upstream virtual bridge 440 (for example, 440*a*-1) and an arbitrary number of downstream virtual bridges 440 (for example, 440*a*-2 and 440*a*-3). The virtual switch 430 needs to be detected as a conventional PCI switch by the host 100 that is connected to the virtual switch 430. Therefore, the virtual switch 430 always includes only one upstream virtual bridge 440 (for example, 440*a*-1) that connects to the associated upstream port 310.

The multi-root switch 300*b* of FIG. 6 includes two virtual switches 430, which are the virtual switch 430*b*-1 connected to the upstream port 310*b*-1 and the virtual switch 430*b*-2 connected to the upstream port 310*b*-2.

The virtual switch 430*b*-1 includes the upstream virtual bridge 440*b*-1, which is connected to the upstream port 310*b*-1, the downstream virtual bridge 440*b*-2, which is connected to the downstream port 320*b*-1, and the downstream virtual bridge 440*b*-3, which is connected to the downstream port 320*b*-2. The virtual switch 430*b*-2 includes the upstream virtual bridge 440*b*-6, which is connected to the upstream port 310*b*-2, the downstream virtual bridge 440*b*-7, which is connected to the downstream port 320*b*-3, and the downstream virtual bridge 440*b*-8, which is connected to the downstream port 320*b*-4.

Meanwhile, the multi-root switch 300*a* includes the virtual switch 430*a*-1 connected to the upstream port 310*a*-1. The virtual switch 430*a*-1 includes the upstream virtual bridge 440*a*-1, which is connected to the upstream port 310*a*-1, the downstream virtual bridge 440*a*-2, which is connected to the downstream port 320*a*-1, and the downstream virtual bridge 440*a*-3, which is connected to the downstream port 320*a*-2.

In this embodiment, no virtual switch 430 is connected to the upstream port 310*a*-2. In the case where the host B (host 100*a*) is not allocated any of the slots 320 in the multi-root switch 300*a*, the multi-root switch 300*a* does not prepare in advance the virtual switches 430 before the host B is booted up.

With the related art, if the host B is booted up without preparing a virtual switch first, the absence of the virtual switch causes the host B to malfunction when the host B conducts a search for a connection destination during the boot up. This embodiment keeps the host B from detecting the absence of the virtual switch by using linkup prevention, which is described later.

FIG. 7 is an explanatory diagram illustrating a virtual switch management table 520*a* and a virtual bridge management table 580*a* according to the first embodiment.

The virtual switch management table 520*a* and virtual bridge management table 580*a* of FIG. 7 correspond to the configurations of the virtual switches 430 and the virtual bridges 440 that are illustrated in FIG. 6.

The virtual switch management table 520*a* includes a switch 521, a virtual switch (VS) number 522, availability 523, a start virtual bridge (VB) number 524, and an entry count 525.

The switch 521 indicates the identifier of the multi-root switch 300. The virtual switch number 522 indicates a virtual switch identifier (VS#). As the availability 523, "Yes" is stored when the virtual switch 430 that is indicated by the virtual switch number 522 is enabled and "No" is stored when the virtual switch 430 is disabled. The start VB number 524 indicates a number that is assigned to the head virtual bridge 440 included in the virtual switch 430, and corresponds to a virtual bridge number 582 described later that is stored in the virtual bridge management table 580*a* at the head of the relevant section of the table. The entry count 525 indicates the entry count of the virtual bridges 440 that are included in the virtual switch 430.

The virtual bridge management table 580*a* includes a switch 581, the virtual bridge number 582, availability 583, a direction 584, a map 585, a port number 586, a VH number 587, and a resource number 588.

The switch 581 indicates the identifier of the multi-root switch 300. The virtual bridge number 582 indicates the identifier of one of the virtual bridges 440 (VB#). As the availability 583, "Yes" is stored when the virtual bridge 440 that is indicated by the virtual bridge number 582 is enabled, and "No" is stored when the virtual bride 440 is disabled. As the direction 584, "up" is stored when the virtual bridge 440 is an upstream virtual bridge, and "down" is stored when the virtual bridge 440 is a downstream virtual bridge. As the map 585, "Yes" is stored when the virtual bridge 440 is mapped onto a port, and "No" is stored when the virtual bridge 440 is not mapped onto a port. The port number 586 indicates a number assigned to the port to which the virtual bridge 440 is connected when the virtual bridge 440 is mapped onto a port. The virtual hierarchy (VH) number 587 indicates the identifier of a VH when the virtual bridge 440 is connected. The resource number 588 indicates the identifier of a resource of the virtual bridge 440 that is actually used. The virtual hierarchy number 587 is obtained by the root complex of the I/O hub 150*a* from the multi-root switches 300 when its host 100 is booted up. In this embodiment, the linkup preventing control modules 370*a*-1 and 370*a*-2 purposely keep the hosts 100 from detecting virtual switches through root complexes when the hosts 100 are booted up.

The virtual switch management table 520*a* and the virtual bridge management table 580*a* are created based on the switch port management table 570 and the host-slot allocation table 500 which are illustrated in FIG. 2. The registers of the virtual switch management table 520*a* and the virtual bridge management table 580*a* except the switch 521 reside in the virtual switch generating logic 390 included in each of the multi-root switches 300. The PCI manager 250 sets values to the registers of the virtual switch management table 520*a* and the virtual bridge management table 580*a*, thereby generating the virtual switches 430. Packet routing is controlled along paths created by the virtual switches 430.

Values stored as the resource number 588 of the virtual bridge management table 580*a* indicate physical resources that are actually connected in order to enable the hosts 100 to connect to the virtual switches 430. Physical resources to which the virtual switches 430 are connected and the virtual bridges 440 have a one-on-one relation. A resource indicated by the resource number 588 therefore needs to be mapped such that a physical resource associated with one virtual bridge 440 is not associated with other virtual bridges 440.

In this embodiment, physical resources for a maximum number of virtual hierarchies are prepared for each port, and a resource number expressed as "(port number 586, VH number 587)" is set as the resource number 588. In the case where every resource is indicated by a unique identifier, a resource may be specified by preparing all resources as a pool and writing the unique identifier of the resource without writing its associated port.

<Linkup Preventing Control with No Virtual Switches 430 Present>

Linkup preventing control executed when the multi-root switches 300 include no virtual switches 430 is described referring to FIGS. 8 to 10.

FIG. 8 is an explanatory diagram illustrating the host-virtual switch management table 560 according to the first embodiment.

The virtual switches 430 are configured in the respective multi-root switches 300. The virtual switches 430 dispersed among the plurality of multi-root switches 300 are managed by their association with each host 100 in the host-virtual switch management table 560.

The host-virtual switch management table 560 includes a global virtual hierarchy (GVH) number 561, a host 562, a host power state 563, and a virtual switch list 564.

The virtual switch list 564 is a list that lists up at least one combination of a multi-root switch 565 and a virtual switch number (VS#) 566 of a virtual switch included in a multi-root switch indicated by the multi-root switch 565.

The host-virtual switch management table 560 of FIG. 8 shows the initial state of this embodiment.

In the host-virtual switch management table 560 of FIG. 8, the virtual switches 430 that are connected to the host 100b are the VS #1 that is included in the multi-root switch 300b and the VS #1 that is included in the multi-root switch 300a. The virtual switch 430 that is connected to the host 100a is the VS #2 that is included in the multi-root switch 300b.

The host-virtual switch management table 560 is created by searching the link destination 575 of the switch port management table 570 using as the keys the virtual switch number 522 of the virtual switch management table 520 and the port number 586 of the virtual bridge management table 580 that is associated with the virtual switch number 522 and has "up" as the direction 584, and then sorting retrieved data with the hosts 100 as the key.

FIG. 9 is an explanatory diagram illustrating a linkup preventing control determining table 590 according to the first embodiment.

The linkup preventing control determining table 590 shows, for each of the multi-root switches 300, a combination of one of the upstream ports 310, the host 100 that is associated with the upstream port 310, and a virtual switch number that is associated with the upstream port 310, and shows whether to execute linkup prevention of the upstream port 310.

The linkup preventing control determining table 590 includes a multi-root switch 591, upstream ports 592, hosts 593, virtual switch numbers (VS#) 594, and preventing states 595. Rows of the linkup preventing control determining table 590 are sorted with the multi-root switch 591 as the key.

In the case where the virtual switches 430 are constituted of cascaded switches (cascade configuration of the multi-root switches 300) and a plurality of hosts 100 share a single upstream port 310, each host 593 and each virtual switch number (VS#) 594 in the linkup preventing control determining table 590 may have two or more values.

The value of the preventing states 595 is "No" when there is at least one virtual switch number (VS#) 594 that is associated, and "Yes" when there is no associated virtual switch number 594.

The linkup preventing control determining table 590 of FIG. 9 shows the initial state of this embodiment.

In the linkup preventing control determining table 590 of FIG. 9, the upstream port 310 of the multi-root switch 300b that has "310b-1" as the value of an upstream port 592a is associated with the virtual switch 430 of the host 100b that has "1" as the value of a virtual switch number 594a. The multi-root switch 300b includes at least one virtual switch 430 and therefore "No" is stored as a preventing state 595a.

The upstream port 310 of the multi-root switch 300b that has "310b-2" as the value of an upstream port 592b is associated with the virtual switch 430 of the host 100a that has "2" as the value of a virtual switch number 594b. The multi-root switch 300b includes at least one virtual switch 430 and therefore "No" is stored as a preventing state 595b of the multi-root switch 300b.

Meanwhile, the upstream port 310 of the multi-root switch 300a that has "310a-1" as the value of the upstream port 592a is associated with the virtual switch 430 of the host 100b that has "1" as the value of the virtual switch number 594a. The multi-root switch 300a includes at least one virtual switch 430 and therefore "No" is stored as the preventing state 595a of the multi-root switch 300a.

The upstream port 310 of the multi-root switch 300a that has "310a-2" as the value of the upstream port 592b is associated with the host 100a. However, the multi-root switch 300a includes no virtual switch 430 and therefore "Yes" is stored as the preventing state 595b.

The linkup preventing control determining table 590 is created based on the host-virtual switch management table 560 and the switch port management table 570.

FIG. 10 is an explanatory diagram illustrating the switch port control register 600 according to the first embodiment.

The switch port control register 600 is a register for controlling the link state of ports of the multi-root switches 300. The switch port control register 600 is set in each multi-root switch by the PCI manager 250, and used by the PCI manager 250 to control the link state.

The switch port control register 600 includes a switch number 601, a port number 602, a port direction 603, and a link direction 604.

The value set as the port direction 603 is the same as one that is set as the direction 573 in the switch port management table 570. However, in the case where its multi-root switch 300 is configured to have ports that can have both "up" and "down" as the port direction 603, a port direction that is actually used may be determined by the value set as the port direction 603 in the switch port control register 600.

The link direction 604 sets a connection method for the multi-root switch 300 when a link is made in accordance with PCI Express. One out of four different values illustrated in FIG. 11 is chosen as the link direction 604.

FIG. 11 is an explanatory diagram illustrating values that the link direction 604 can have according to the first embodiment.

When the set value of the link direction 604 is "up", a port that has the associated port number 602 is "linked as an upstream port." When the set value of the link direction 604 is "down", a port that has the associated port number 602 is "linked as a downstream port." When the set value of the link direction 604 is "cross", a port that has the associated port number 602 is "linked as a bidirectional port."

When the set value of the link direction 604 is "not linked", the linkup preventing control module 370 that is associated with the port 310 to which the value "not linked" is set restrains linkup. Because linkup is restrained, link processing is not executed and a component that is connected to the port 310 to which the value "not linked" is set, for example, one of the hosts 100, detects that the link is disconnected.

In the switch port control register 600 of FIG. 10, the value "not linked" is set as the link direction 604 to the upstream port 310*a*-2 of the multi-root switch 300*a* which has "Yes" as the value of the preventing state 595 in the linkup preventing control determining table 590. Among ports of the multi-root switches 300 that have "No" as the value of the preventing state 595, the upstream ports 310 and the switch management ports 330 are set to "up" as the link direction 604 and the downstream ports 320 are set to "down" as the link direction 604.

In the switch port control register 600 of FIG. 10, the value "down" instead of the value "not linked" is set as the link direction 604 to the downstream ports 320*b*-2, 320*a*-3, and 320*a*-4, which are the downstream ports 320 that are not connected to devices of the hosts 100 or others. The link direction 604 of these downstream ports 320 has the value "down" because, this way, hot-plug can be used when devices of the hosts 100 or others are added later to the slots 320.

The upstream port 310*a*-2, on the other hand, is set to the value "not linked" as the link direction 604. The linkup preventing control module 370*a*-2 which is associated with the upstream port 310*a*-2 therefore restrains linkup in the upstream port 310*a*-2.

The PCI manager 250 sets the settings of the switch port control register 600 to the multi-root switch 300*a*. This causes the host 100*a* to which the upstream port 310*a*-2 is connected to detect a link of the root port 160*a*-2 as disconnected, thus making it possible to boot up the host 100*a* without a problem despite the absence of a virtual switch associated with the host 100*a* in the multi-root switch 300*a*.

The PCI manager 250 may allow the settings of the switch port control register 600 to be reflected on its multi-root switch 300 after the settings of the virtual switches 430 in the multi-root switch 300 are updated, or when the relevant host 100 is powered on.

As described above, setting those settings to the multi-root switches 300*a* and 300*b* enables the safe booting of the hosts 100*a* and 100*b*.

FIG. 12 is an explanatory diagram illustrating a root port hot-plug state management table 610 according to the first embodiment.

The root port hot-plug state management table 610 is included in the root port hot-plug control module 540. The root port hot-plug state management table 610 is a table for managing for each of the root ports 160 of the hosts 100 the state of its associated hot-plug controller 170.

The root port hot-plug state management table 610 includes a host number 611, a root port 612, a PWR state 613, a PWE LED state 614, and an ATN LED state 615.

The host number 611 indicates the identifier of one of the hosts 100. The root port 612 indicates the identifier of one of the root ports 160. The PWR state 613 indicates the power on/off state of the root port 160 that is indicated by the root port 612. The PWE LED state 614 indicates the state of a power indicator. The ATN LED state 615 indicates the state of an attention indicator.

The keys of the root port hot-plug state management table 610 are the host number 611 and the root port 612.

The root port hot-plug state management table 610 may include other set values related to hot-plug controllers. However, those set values are not necessary in this embodiment and their description is omitted.

While the hosts 100 are shut down, every root port 160 of the hosts 100 has "Off" as the values of the power (PWR) state 613, the PWE LED state 614, and the ATN LED state 615.

While the hosts 100 are running, the root port 160 that is associated with the upstream port 310 for which the preventing state 595 is determined as "No" in the linkup preventing control determining table 590 (this root port 160 can be retrieved from the switch port management table 570) has "On" as the value of the power (PWR) state 613.

While the hosts 100 are running, the root port 160 that is associated with the upstream port 310 for which the preventing state 595 is determined as "Yes" has "Off" as the value of the power (PWR) state 613.

Figure 13:
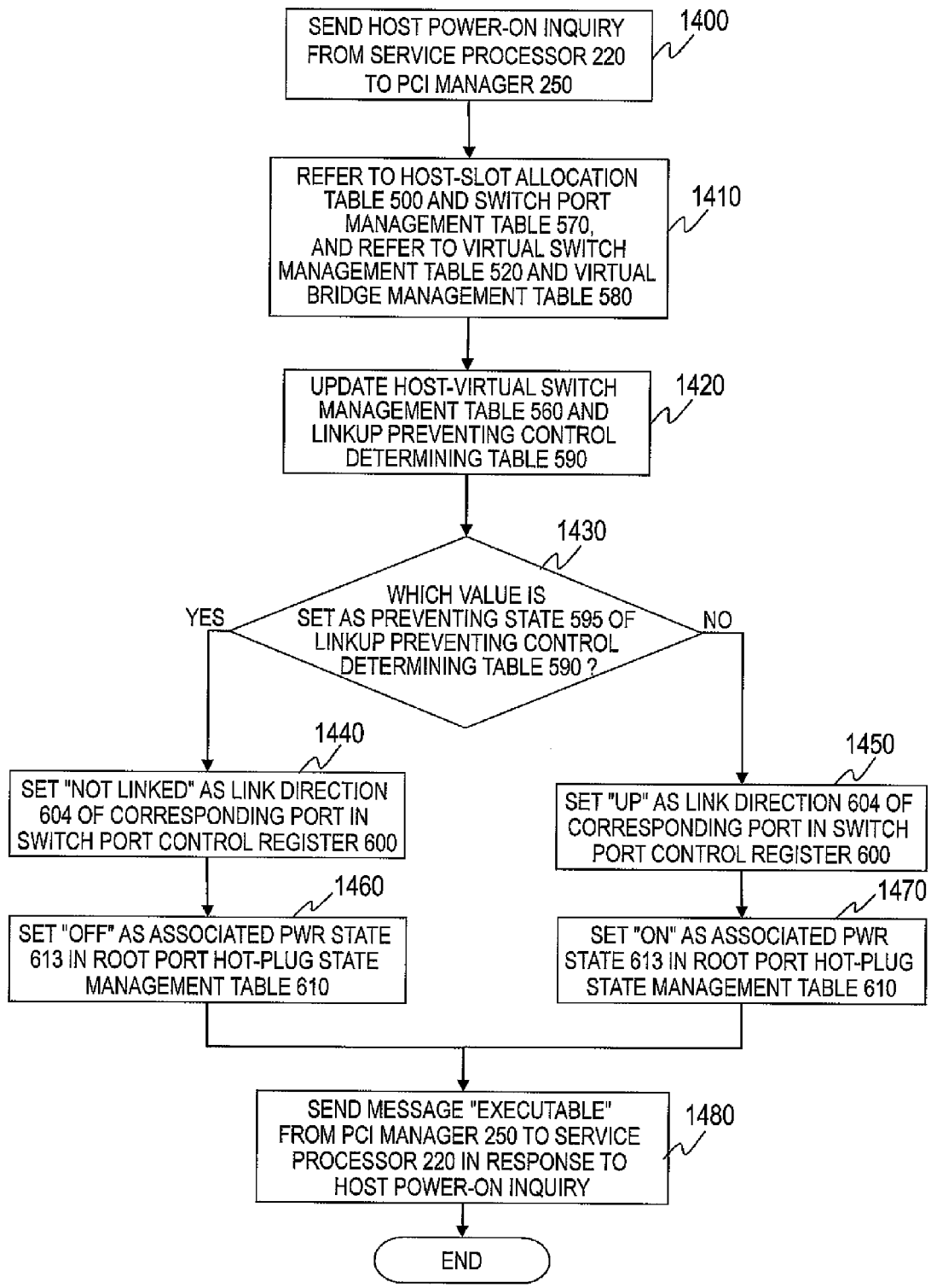
FIG. 13 is a flow chart illustrating linkup prevention which is executed upon boot up of the hosts according to the first embodiment.

Processing of restraining linkup in an upstream port is described referring to a flow chart of FIG. 13.

FIG. 13 is a flow chart illustrating linkup prevention which is executed upon boot up of the hosts 100 according to the first embodiment.

The flow chart illustrates an example of processing of setting linkup prevention to an upstream port that has no virtual switch 430 in its multi-root switch 300 at the time when the virtual switches 430 are generated in response to an inquiry about powering one of the hosts 100 on.

When an instruction to power one of the hosts 100 on is given from the management console 240, an inquiry about whether or not the host 100 can be powered on is sent from the service processor 220 to the PCI manager 250 (Step 1400). The PCI manager 250 refers to the virtual switch management table 520 and the virtual bridge management table 580 using the host-slot allocation table 500 and the switch port management table 570, and refers to the multi-root switches 300 as directed by the virtual switch management table 520 and the virtual bridge management table 580 (Step 1410).

The PCI manager 250 then updates the host-virtual switch management table 560 and the linkup preventing control determining table 590 based on the host-slot allocation table 500, the switch port management table 570, the virtual switch management table 520, and the virtual bridge management table 580 (Step 1420).

The PCI manager 250 determines whether the preventing state 595 of the linkup preventing control determining table 590 is "Yes" or "No" (Step 1430).

When the preventing state 595 is "Yes", the PCI manager 250 sets the value "not linked" as the link direction 604 in the switch port control register 600 to a port corresponding to the upstream port 592 that has "Yes" as the value of the preventing state 595 (Step 1440). The PCI manager 250 also sets "Off" (powered-off state) as the power (PWR) state 613 in the root port hot-plug state management table 610 to the port corresponding to the upstream port 592 that has "Yes" as the value of the preventing state 595 (Step 1460).

When the preventing state 595 is "No", on the other hand, the PCI manager 250 sets the value "up" as the link direction 604 in the switch port control register 600 to a port corresponding to the upstream port 592 that has "No" as the value of the preventing state 595 (Step 1450). The PCI manager 250 also sets "On" (powered-on state) as the power (PWR) state 613 in the root port hot-plug state management table 610 to the port corresponding to the upstream port 592 that has "No" as the value of the preventing state 595 (Step 1470).

After Step 1460 or Step 1470, the PCI manager 250 responds to the service processor 220 that the host can be powered on (Step 1480).

Through the above-mentioned processing, the PCI manager 250, upon receiving an inquiry about whether the host 100 that is currently not running can be booted up (powered on), commands the multi-root switches 300 to restrain linkup of the upstream ports 310 (to cut off power to the upstream ports) to which this host 100 is connected, and then permits the service processor 220 to power the host 100 on.

The host 100 is booted up upon reception of a power-on instruction from the service processor 220, and the root ports 160 access the upstream ports 310 of the multi-root switches 300 to which the root ports 160 are connected to attempt to detect the PCI bus tree configuration. However, the configurations of the multi-root switches 300 are hidden from the host 100 because the linkup preventing control modules 370 of the multi-root switches 300 are cutting off power to the upstream ports 310 that are connected to the host 100 to be booted up.

This eliminates the need to set virtual switches in the multi-root switches 300 before the hosts 100 are booted up, and prevents an increase in number of components such as LSIs of the multi-root switches 300 which is observed in the example of the related art described above. The manufacturing cost of a computer system is thus reduced.

<Hot-Plug to an Unallocated Slot 320>

Figure 14:
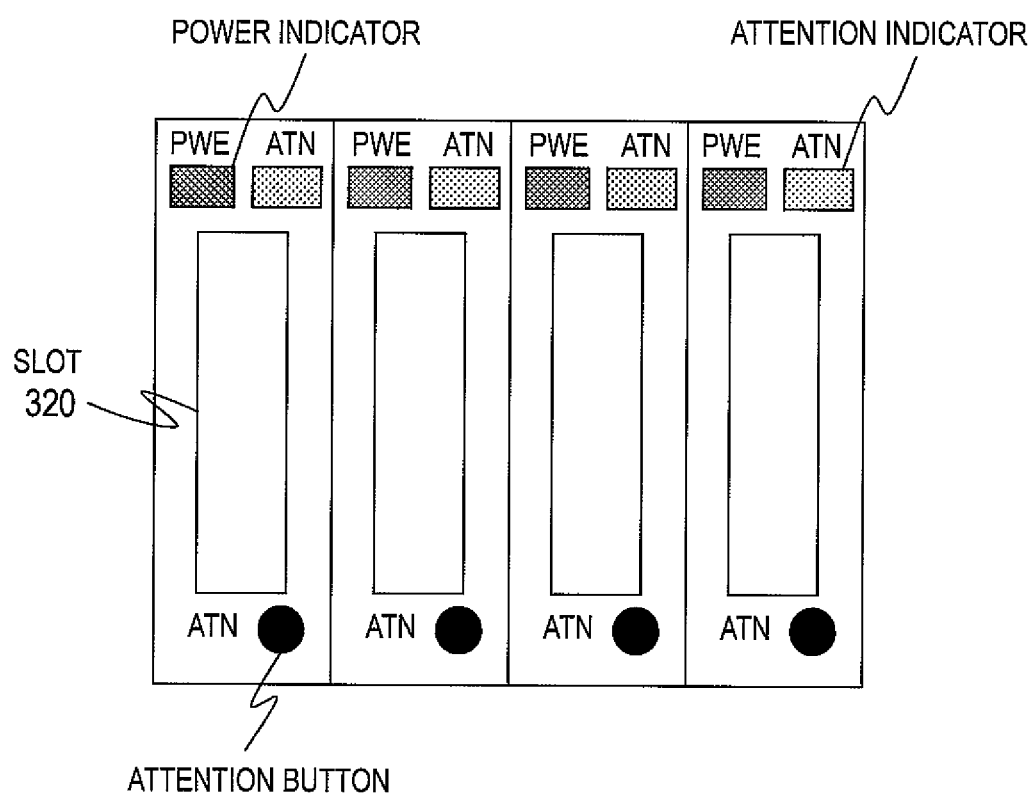
FIG. 14 is an explanatory diagram illustrating a PCI Express slots which supports hot-plug according to the first embodiment.

A description is given referring to FIGS. 1 and 14 on processing executed when an I/O device 420a-4 is newly plugged to the downstream port 320a-4 of the multi-root switch 300a which is the slot 320 that has not been allocated to any of the hosts 100.

FIG. 14 is an explanatory diagram illustrating the PCI Express slots 320 which supports hot-plug according to the first embodiment.

The PCI Express slots 320 of FIG. 14 each include an attention button, a power indicator, and an attention indicator. The PCI Express slots 320 of FIG. 14 are mounted in conformity to the PCI Express standard.

The attention button is a button pressed by the user in order to notify the relevant host 100 of the plug in or removal of a device. The power indicator indicates the power on/off state of its slot 320, and may be implemented by an LED (one that emits green color light is desirable). The attention indicator indicates that processing is ongoing or indicates an error state, and may be implemented by an LED (one that emits amber or yellow light is desirable).

To hot-add an I/O device (to plug in an I/O device while the relevant host 100 is running) to one of the slots 320, the user or the system administrator plugs the I/O device into the slot 320 and then presses the attention button to notify the host 100 of the fact that an I/O device has been plugged in. Notifying the host 100 of the fact that an I/O device has been plugged in causes its OS 210 and BIOS 200 to execute hot-plug processing on the host 100 and, as a result, the I/O device newly plugged in is made available for use.

In the multi-root switches 300 of this embodiment, hot-plug processing that is executed when an I/O device (hereinafter referred to as physical device) is physically plugged in (hereinafter referred to as physical hot-plug) is detected by the physical hot-plug controllers 340, which are provided on a one-on-one basis with respect to the downstream ports 320. The physical hot-plug controllers 340 also notify the PCI manager 250 of information on physical hot-plug via the switch management ports 330.

Notified that a physical device has been hot-plugged, the PCI manager 250 updates the switch port management table 570 based on the notified information on physical hot-plug. When there is a host 100 that is allocated this physical device, a hot-plug signal is sent to the host 100 (hereinafter referred to as virtual hot-plug) via the relevant multi-root switch 300.

A physical device supporting the multi-root I/O virtualization technology may be shared among a plurality of hosts 100. When a plurality of hosts 100 share a single physical device, plugging in the physical device generates a notification of physical hot-plug to the hosts 100 once, and generates a notification of virtual hot-plug as many times as the number of the hosts 100 that share the physical device.

Virtual hot-plug controllers 350 for controlling virtual hot-plug are provided in sets with the downstream virtual bridges 440 and allocated in accordance with the settings of the virtual switches 430. In this embodiment, because the downstream port 320a-4 is not allocated to any of the hosts 100 at the time when the I/O device 420a-4 is plugged in, the PCI manager 250 merely updates the switch port management table 570 and does not notify the host 100 of virtual hot-plug.

FIG. 15 is an explanatory diagram illustrating a switch port management table 570b, which reflects the computer system after the I/O devices 420 are added to the slots 320 according to the first embodiment.

In the switch port management table 570b of FIG. 15, a row that has the multi-root switch 300a as the switch 571 and the downstream port 320a-4 as the port number 572 is updated by the PCI manager 250. The type 574 is updated with "device" and the link destination 575 is updated with "420a-4" in the row having "300a" as the switch 571 and "320a-4" as the port number 572.

<Adding an Unallocated Slot 320>

Next, description is given on a procedure of adding the slot 320 that has not been allocated to any of the hosts 100 to the host 100 that is running.

Figure 16:
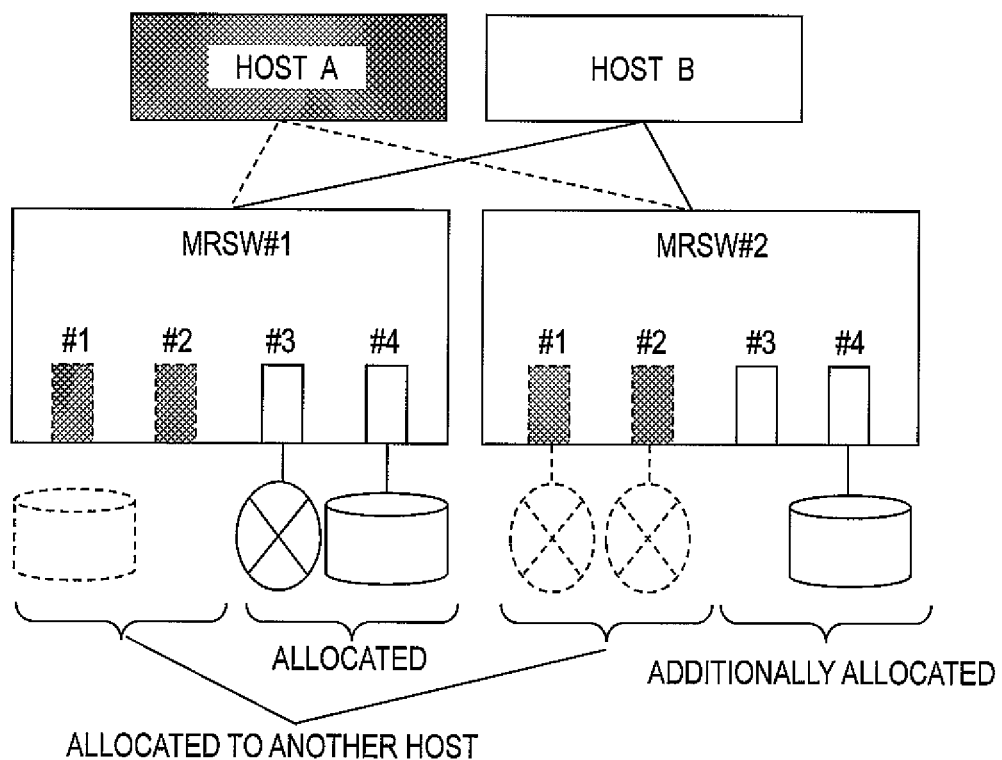
FIG. 16 is an explanatory diagram illustrating a GUI screen for setting an allocation of the unallocated slot to the host B according to the first embodiment.

FIG. 16 is an explanatory diagram illustrating a GUI screen for setting the allocation of the unallocated slot 320 to the host B according to the first embodiment.

FIG. 16 illustrates a GUI screen displayed on the management console 240 in order to enable the user or the system administrator to cause the PCI manager 250 to add the slots #3 and #4 (downstream ports 320a-3 and 320a-4) of the MRSW #2 (multi-root switch 300a) to the host B (host 100a). The user or the system administrator allocates the slots #3 and #4 to the host B through the GUI screen of FIG. 16.

Through the operation of allocating the slots #3 and #4 to the host B, the host 100a is allocated the downstream port 320a-3 which is an unallocated slot 320 and the downstream port 320a-4 into which the I/O device 420a-4 has been plugged.

FIG. 17A is an explanatory diagram illustrating a host-slot allocation table 500c according to the first embodiment.

FIG. 17B is an explanatory diagram illustrating a host-slot allocation table 500d according to the first embodiment.

FIGS. 17A and 17B respectively illustrate the host-slot allocation table 500c and the host-slot allocation table 500d which reflect the computer system after the downstream ports 320a-3 and 320a-4 are allocated to the host 100a.

Compared to the host-slot allocation table 500a of FIG. 3A, the host-slot allocation table 500c has two additional rows in a row that has "host B" as the host 501. The additional rows both have "MRSW #2" as the switch 502, and respectively have "slot #3" and "slot #4" as the slot 503.

Through the operation of allocating the slots #3 and #4 to the host B, a virtual switch 430a-2 is newly generated in the multi-root switch 300a.

Figure 18:
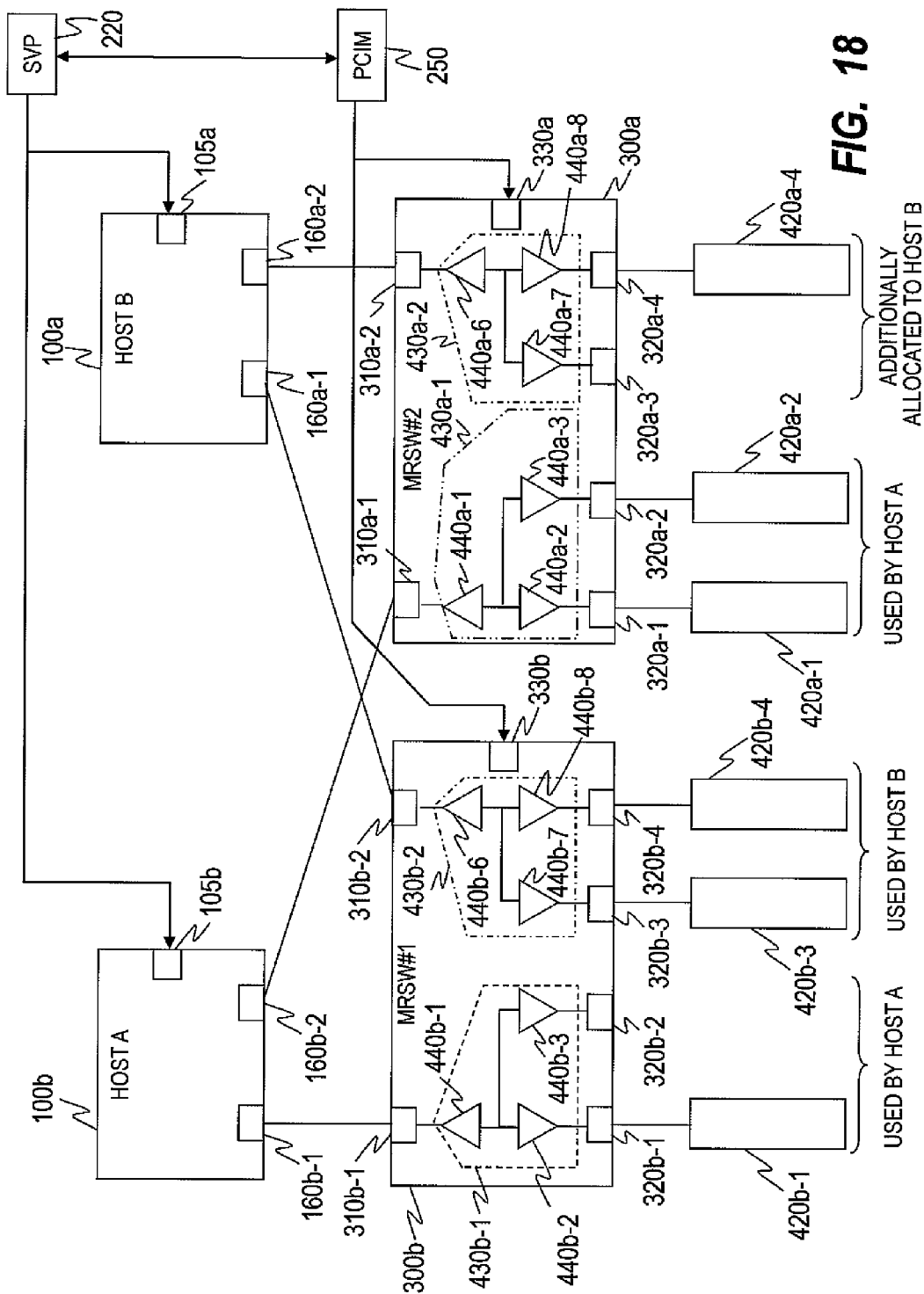
FIG. 18 is an explanatory diagram illustrating the virtual switch that is newly generated according to the first embodiment.

FIG. 18 is an explanatory diagram illustrating the virtual switch 430a-2 that is newly generated according to the first embodiment.

The multi-root switch 300a includes the virtual switch 430a-2. The virtual switch 430a-2 includes an upstream virtual bridge 440a-6, which is associated with the upstream port 310a-2, a downstream virtual bridge 440a-7, which is associated with the downstream port 320a-3, and a downstream virtual bridge 440a-8, which is associated with the downstream port 320a-4.

Figure 19:
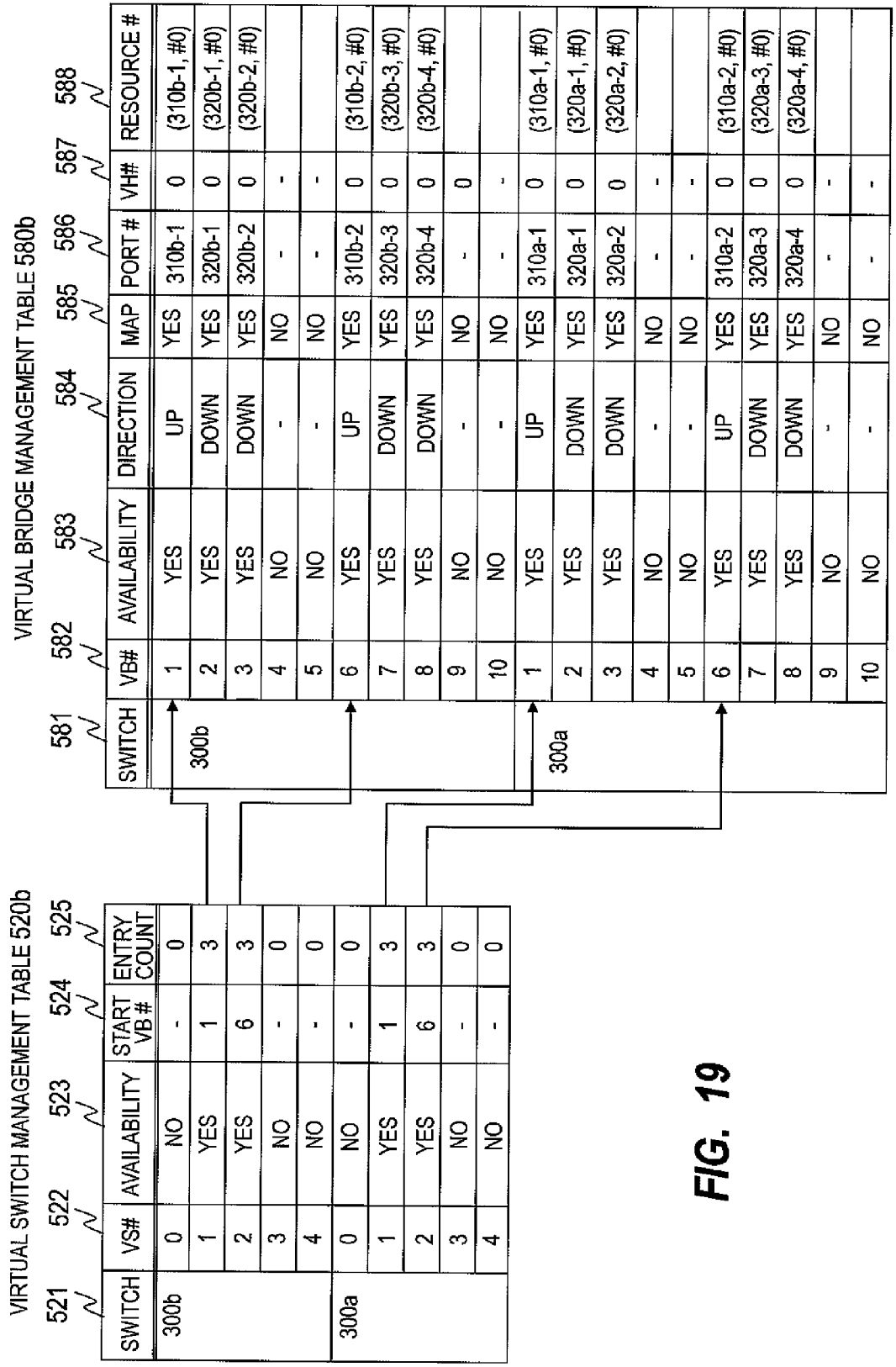
FIG. 19 is an explanatory diagram illustrating the virtual switch management table and the virtual bridge management table, which reflect the computer system after the slots are allocated to the host B according to the first embodiment.

FIG. 19 is an explanatory diagram illustrating a virtual switch management table 520b and a virtual bridge management table 580b, which reflect the computer system after the slots 320 are allocated to the host B according to the first embodiment.

The PCI manager 250 adds set values of the newly generated virtual switch 430a-2 to the virtual switch management table 520b and the virtual bridge management table 580b.

Compared to the virtual switch management table 520a of FIG. 7, the virtual switch management table 520b of FIG. 19 is updated in a row that has the multi-root switch 300a as the switch 521 and "2" as the VS number 522.

Compared to the virtual bridge management table 580a of FIG. 7, the virtual bridge management table 580b of FIG. 19 is updated in a row that has the multi-root switch 300a as the switch 581 and "6", "7", and "8" as the VB number 582.

Changes in the virtual switches 430 call for updates to the host-virtual switch management table 560, the linkup preventing control determining table 590, and the switch port control register 600.

FIG. 20 is an explanatory diagram illustrating a host-virtual switch management table 560b, which reflects the computer system after the slots 320 are allocated to one of the hosts 100 according to the first embodiment.

Compared to the host-virtual switch management table 560 of FIG. 8, the host-virtual switch management table 560b of FIG. 20 is updated in the switch 565 and VS number 566 of the virtual switch list 564 in a row that has "2" as the global virtual hierarchy (GVH) number 561 and "100a" as the host 562. The global virtual hierarchy (GVH) number 561 is an identifier that indicates a virtual hierarchy in the computer system. The global virtual hierarchy (GVH) number 561 may be set by the PCI manager 250.

FIG. 21 is an explanatory diagram illustrating a linkup preventing control determining table 590b, which reflects the computer system after a slot is allocated to a host according to the first embodiment.

Compared to the linkup preventing control determining table 590 of FIG. 9, the linkup preventing control determining table 590b of FIG. 21 is updated in the virtual switch number 594b and the preventing state 595b in a row that has the multi-root switch 300a as the switch 591 and the upstream port 310a-2 as the upstream port 592b.

FIG. 22 is an explanatory diagram illustrating a switch port control register 600b, which reflects the computer system after the slots 320 are allocated to one of the hosts 100 according to the first embodiment.

Compared to the switch port control register 600 of FIG. 10, the switch port control register 600b of FIG. 22 is updated in a row that has the multi-root switch 300a as the switch 601 and the upstream port 310a-2 as the port number 602 such that the link direction 604 is changed from "not linked" to "up".

Updating the link direction 604 of the upstream port 310a-2 from "not linked" to "up" in the switch port control register 600 cancels the linkup prevention on the upstream port 310a-2 and establishes a connection on the physical layer and data link layer of a PCIe link 400a-2 between the root port 160a-2 and the upstream port 310a-2 which is illustrated in FIG. 1.

In the case where the host 100a to which the slots 320 are to be allocated has not been running, the host 100a is booted up after changing the configurations of the virtual switches 430 is completed, and subsequent processing is therefore unnecessary. The subsequent processing is executed only when the host 100a has already been booted up.

At the time when the host 100a is booted up, the upstream port 310a-2 of the multi-root switch 300a is restrained from performing linkup and cannot link to the root port 160a-2. Hence, the host 100a detects the PCI tree no further than the root port 160a-2. When the virtual switches 430 are added after the host 100a is booted up, the host 100a still does not detect the virtual switches 430.

The PCI manager 250 causes the host 100a to detect the virtual switches 430 that are included in the multi-root switch 300a by controlling the hot-plug controller 170a-2, which is associated with the root port 160a-2 of the host 100a, with the root port hot-plug control module 540.

Figure 23:
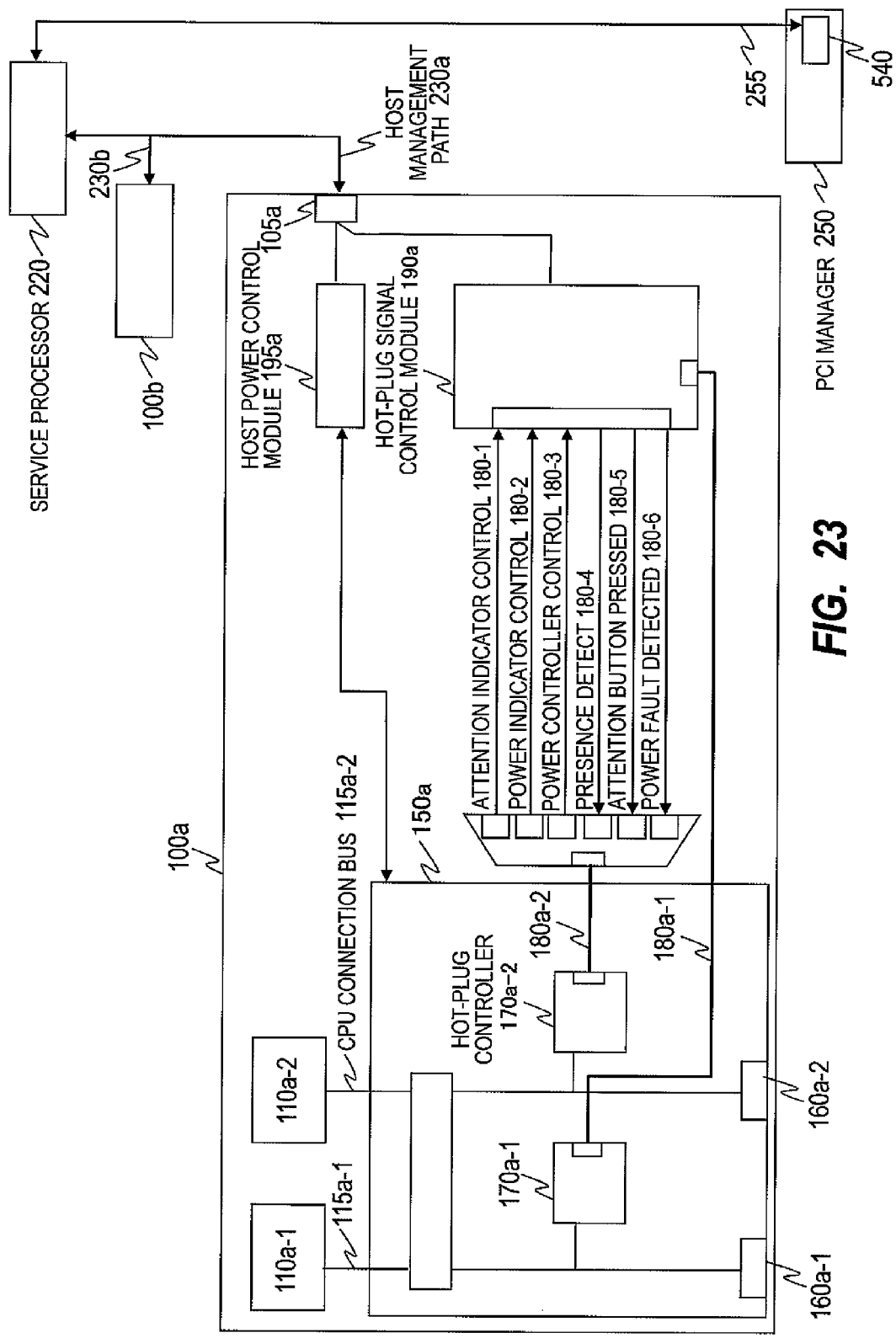
FIG. 23 is a block diagram illustrating a hot-plug controllers, hot-plug control signals, and a hot-plug signal control module according to the first embodiment.

FIG. 23 is a block diagram illustrating the hot-plug controllers 170, the hot-plug control signals 180a, and the hot-plug signal control module 190a according to the first embodiment.

The hot-plug controllers 170, hot-plug control signals 180a, and hot-plug signal control module 190a of FIG. 1 are described in detail referring to FIG. 23.

Hot-plug control signals 180a-2 are a group of several signals relevant to the hot-plug controller 170a-2.

The hot-plug control signals 180a-2 in this embodiment are six different signals, which are an attention indicator control signal 180-1, a power indicator control signal 180-2, a power controller control signal 180-3, a presence detect signal 180-4, an attention button pressed signal 180-5, and a power fault detected signal 180-6.

The attention indicator control signal 180-1, the power indicator control signal 180-2, and the power controller control signal 180-3 are signals output from the hot-plug controller 170a-2, and used when the OS 210a and the BIOS 200a in the host 100a operate the hot-plug controllers 170.

The attention indicator control signal 180-1 is used to change the attention indicator state.

The power indicator control signal 180-2 is used to change the power indicator state.

The power controller control signal 180-3 is used to change the power state.

The presence detect signal 180-4, the attention button pressed signal 180-5, and the power fault detected signal 180-6 are signals input to the hot-plug controller 170a-2, and used to notify the OS 210a and the BIOS 200a in the host 100a of the state of the side of the slots 320 and specifics of a change.

The presence detect signal 180-4 is used to notify the fact that the I/O devices 420 have been found at the slots 320 that are associated with the host 100a.

The attention button pressed signal 180-5 is used to notify the fact that the attention buttons for the slots 320 have been pressed.

The power fault detected signal 180-6 is used when power to the slots 320 is cut off by some accident.

The signal, group of the hot-plug control signals 180a-2 is connected, in the case of a PCI Express slot of the related art, to power controllers or attention buttons in the slots 320. In the case of the root ports 160 connected to the multi-root switches 300, unlike the slots 320 of the related art, there are no power controllers nor attention buttons in the slots 320 (a common mode is to mount the hosts 100 and the multi-root switches 300 in chassis and connect the chassis via a backplane).

Consequently, a plurality of hot-plug control signals are all gathered in the host plug signal control module 190a in the host 100a, and sent and received by the hot-plug signal control module 190a to and from the service processor 220 via a host management path 230a. The plurality of hot-plug control signals in the service processor 220 are controlled by the PCI manager 250, and the configuration of the virtual switches 430 can thus be changed dynamically with the use of the mechanism of hot-plug.

Figure 24:
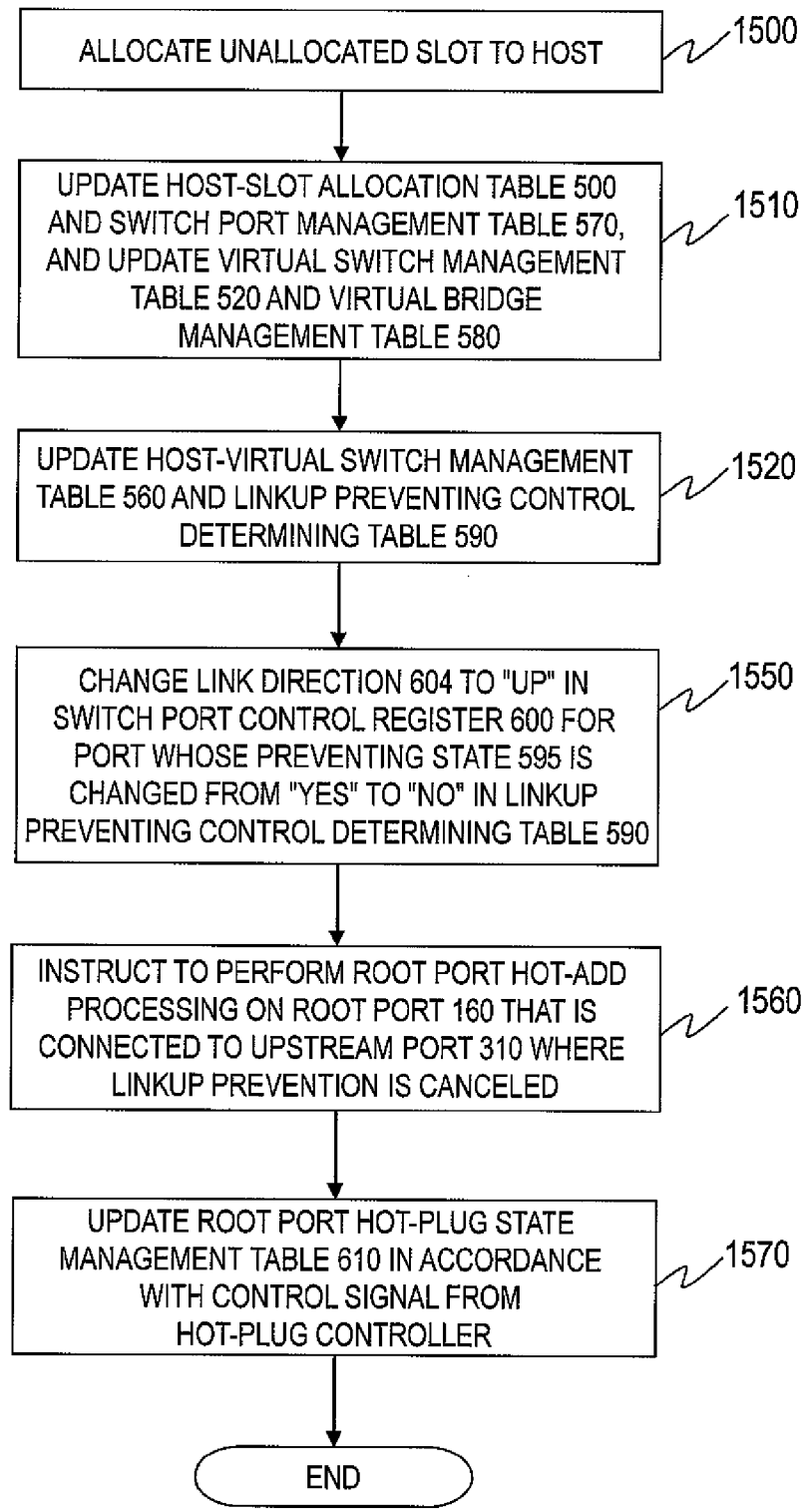
FIG. 24 is a flow chart illustrating processing that is executed by the PCI manager to notify the root ports of hot-add according to the first embodiment.

A concrete processing procedure of hot-add which is one of the features of the hot-plug mechanism is illustrated in a flow chart of FIG. 24.

FIG. 24 is a flow chart illustrating processing that is executed by the PCI manager 250 to notify the root ports 160 of hot-add according to the first embodiment.

The PCI manager 250 performs processing of allocating the slots 320 that has not been allocated to one of the hosts 100 (Step 1500). Thereafter, the PCI manager 250 updates the host-slot allocation table 500 and the switch port management table 570, and updates the virtual switch management table 520 and the virtual bridge management table 580 based on the updated host-slot allocation table 500 and switch port management table 570 (Step 1510).

After Step 1510, the PCI manager 250 updates the linkup preventing control determining table 590b (Step 1520). The PCI manager 250 subsequently changes the link direction 604 to "up" in the switch port control register 600 for the upstream port 310a-2 whose preventing state 595 has been changed from "Yes" to "No" in the linkup preventing control determining table 590b in Step 1520 (Step 1550).

The PCI manager 250 then instructs the root port hot-plug control module 540 to perform hot-add (Step 1560).

The root port hot-plug control module 540 notifies hot-add to the hot-plug signal control module 190a via the PCIM management path 255 and the host management path 230a. The hot-plug signal control module 190a sends the attention button pressed signal 180-5 to the hot-plug controller 170a-2 of the root port 160a-2, which is associated with the upstream port whose preventing state 595 has been changed to "No". By receiving the attention button pressed signal 180-5, the hot-plug controller 170a-2 detects that the attention button of the slot 320 that is associated with the hot-plug controller 170a-2 has been pressed, and sends a hot-plug interruption notification to the relevant CPU 110a via one of the CPU connection buses 115a.

Receiving the hot-plug interruption notification, the OS 210a and the BIOS 200a executes hot-add processing. The hot-add processing includes sending an instruction to update the content of the power indicator control signal 180-2 to "Blink", a subsequent instruction to update the content of the power controller control signal 180-3 to "On", and a subsequent instruction to update the content of the power indicator control signal 180-2 to "On" from the OS 210a to the hot-plug controller 170a-2.

The hot-plug controller 170a-2 executes the instructions received from the OS 210a, and sends the power indicator control signal 180-2, then the power controller control signal 180-3, and then the power indicator control signal 180-2 to the hot-plug signal control module 190a.

The hot-plug signal control module 190a sends the sequentially received power indicator control signal 180-2, power controller control signal 180-3, and power indicator control signal 180-2 to the root port hot-plug control module 540 via the host management path 230a and the PCIM management path 255 in the order received. The root port hot-plug control module 540 updates the root port hot-plug state management table 610 based on the received signals (Step 1570).

The processing described above enables the hosts 100 to detect the I/O devices 420 through hot-add executed after the hosts 100 are booted up. Specifically, at the time when the hosts 100 are booted up, power to the upstream ports 310 is cut off, so that the hosts 100 are booted up smoothly without generating the virtual switches 430. After the hosts 100 are booted up, the virtual switches 430 are generated and it is not until the I/O devices 420 of the unallocated slots 320 become available for use that the PCI manager 250 notifies the hosts 100 of hot-add. Receiving the hot-add notification, the hot-plug controllers 170 of the hosts 100 send a hot-plug interruption notification to the OSs 210. This enables the OSs 210 to detect and use the PCI bus trees of the multi-root switches 300 and the I/O devices 420.

As has been described, in this invention, the virtual switches 430 in the multi-root switches 300 are generated at the time when the hosts 100 use the I/O devices 420, and then the hosts 100 are made aware of PCI bus trees through hot-plug. This eliminates the need to reserve resources in a number based on the number of hosts 100 that can be connected and the number of available slots which is observed in the related art described above. The hosts 100 and the I/O devices 420 can thus be connected without fail while preventing the amount of materials such as LSIs installed in the multi-root switches 300 from increasing.

FIG. 25 is an explanatory diagram illustrating a root port hot-plug state management table 610b according to the first embodiment.

The root port hot-plug control module 540 receives the power indicator control signal 180-2 and then updates the value of the PWE LED state 614 of the root port 160a-2 from "Off" to "Blink" in the root port hot-plug state management table 610b.

Subsequently, the root port hot-plug control module 540 receives the power controller control signal 180-3 and then updates the value of the PWR state 613 of the root port 160a-2 from "Off" to "On" in the root port hot-plug state management table 610b.

Subsequently, the root port hot-plug control module 540 receives the power indicator control signal 180-2 and then updates the value of the PWE LED state 614 of the root port 160a-2 from "Blink" to "On" in the root port hot-plug state management table 610b.

As a result of the hot-add processing described above, the OS 210a and the BIOS 200a re-count elements further down the PCI tree than the root port 160a-2 (re-enumeration). The OS 210a and the BIOS 200a also detect the virtual switch 430a-2, which has newly been generated in the multi-root switch 300a, and make the added slot 320a-3 (downstream port 320a-3), slot 320a-4 (downstream port 320a-4), and I/O device 420a-4 available for use.

Further, hot-plugging the unallocated slots 320 in the manner described above makes adding the unallocated slots 320 dynamically to the running hosts 100 executable.

To perform the reverse of hot-plug, i.e., to remove the already allocated slots 320 from the running hosts 100, hot-remove processing is employed. The hot-remove processing excludes the virtual switches 430 included in the multi-root switches 300 and cuts off power to the root ports 160 again, thereby making subsequent hot-add through reallocation of the slots 320 possible.

Figure 26:
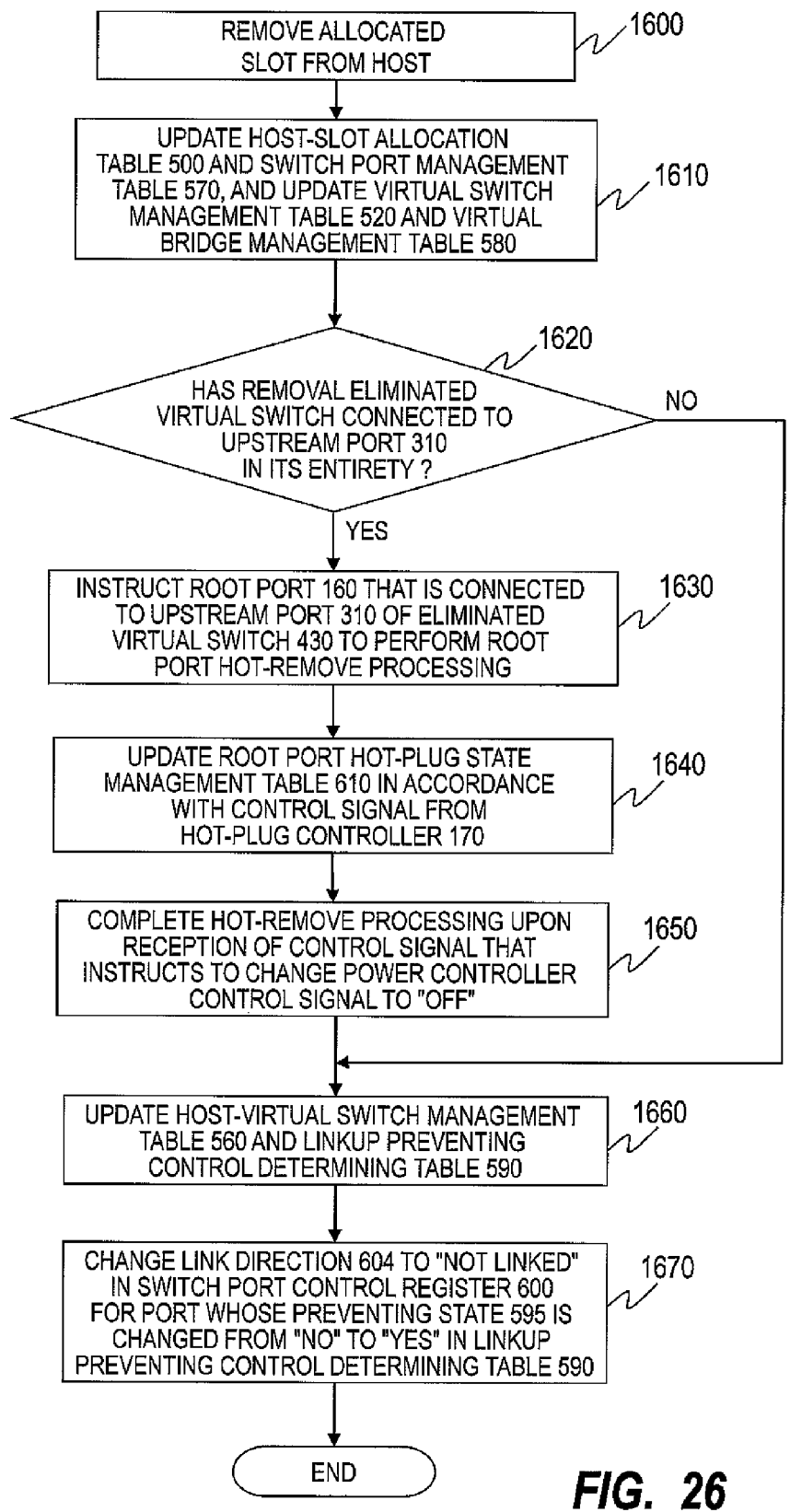
FIG. 26 is a flow chart illustrating hot-remove processing according to the first embodiment.

FIG. 26 is a flow chart illustrating hot-remove processing according to the first embodiment.

When the I/O device 420a-4 is pulled out of the slot 320a-4 which has already been allocated, the multi-root switch 300a where the pulling out of the I/O device 420a-4 occurs sends a request to remove the allocated slots 320a-4 to the PCI manager 250 (Step 1600).

The PCI manager 250 updates the host-slot allocation table 500c and the switch port management table 570b, and updates the virtual switch management table 520b and the virtual bridge management table 580b based on the updated host-slot allocation table 500c and switch port management table 570b. By changing these tables, the configuration of the virtual switches 430 is changed (Step 1610).

The PCI manager 250 determines whether or not the removal of the slot 320a-4, which is allocated to the I/O device 420a-4, out of the slots 320 that are allocated to one of the virtual switches 430 eliminates the one virtual switch 430 (Step 1620).

In the case where the removal does not eliminate the virtual switch 430, the processing moves to Step 1660.

In the case where the removal eliminates the one virtual switch 430, the PCI manager 250 changes the settings of the upstream port 310a-2 to which the virtual switch 430 is connected and the settings of the root port 160a-2 by instructing the root port 160a-2 which is connected to the upstream port 310a-2 to perform hot-remove processing (Step 1630).

The hot-remove processing includes sending the attention button pressed signal 180-5 to the hot-plug controller 170a-2. By receiving the attention button pressed signal 180-5, the hot-plug controller 170a-2 detects that the attention button of the slot 320 that is associated with the hot-plug controller 170a-2 has been pressed, and sends a hot-plug interrupt notification to one of the CPUs 110a via one of the CPU connection buses 115a.

Receiving the hot-plug interruption notification, the OS 210a and the BIOS 200a execute the hot-remove processing. The OS 210a sends an instruction about the hot-remove processing to the root port hot-plug control module 540 via the hot-plug controller 170a-2 and the hot-plug signal control module 190a. The root port hot-plug control module 540 updates the root port hot-plug state management table 610b based on the received instruction about the hot-remove processing (Step 1640). The transmission of an instruction from the OS 210a to the root port hot-plug control module 540 is relayed by the service processor 220.

The root port hot-plug control module 540 receives an instruction from the OS 210a to change the power controller control signal 180-3 to "Off" and completes the hot-remove processing (Step 1650). The OS 210a may send this instruction to change to "Off" after a given period of time elapses since the reception of the hot-remove instruction from the PCI manager 250.

The root port hot-plug control module 540 updates the linkup preventing control determining table 590 according to the configuration of the virtual switch 430 which has been updated in Step 1610 (Step 1660).

The root port hot-plug control module 540 updates the link direction 604 to "not linked" in the switch port control register 600 for the upstream port 310 whose linkup preventing state 595 has been updated from "No" to "Yes" in the linkup preventing control determining table 590 (Step 1670).

In the case where the one of the hosts 100 is rebooted, the processing described above prevents the host 100 from searching a PCI tree beyond the upstream port 310 that has no virtual switches 430 set. This way, the rebooted host 100 can run stably despite no virtual switches 430 being set.

According to the first embodiment described above, dynamic reconfiguration such as adding or removing the slots 320 after the hosts 100 are booted up is executable.

Second Embodiment

A second embodiment of this invention is described next. The second embodiment relates to power control of the multi-root switches 300.

An initial state in the second embodiment is the same as the one in the first embodiment, namely, the one illustrated in FIGS. 3A and 3B and FIGS. 4A and 4B.

In the allocation of the slots 320 to the hosts 100 of FIGS. 3B and 4B, when the host A (100b) is powered off and the host B (100a) alone is powered on, the multi-root switch 300a does not need to be powered on because the host 100a uses none of the slots 320 that are placed under the multi-root switch 300a. A procedure of performing power saving control when the multi-root switch 300a does not need to be powered on is described later.

Figure 27:
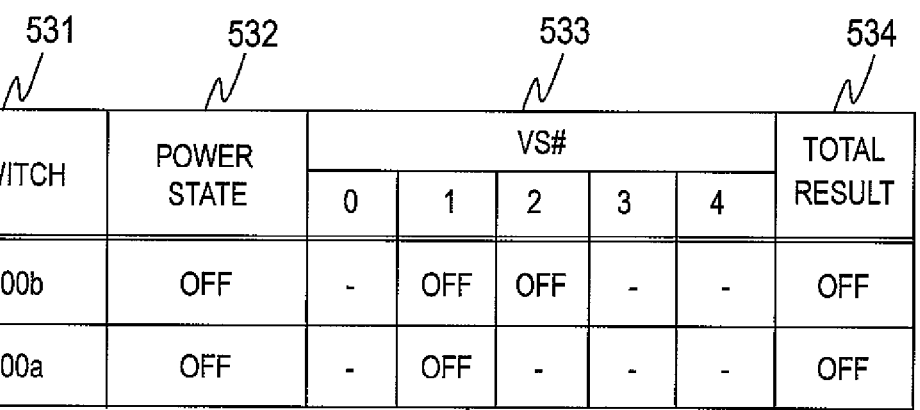
FIG. 27 is an explanatory diagram illustrating a switch power state management table according to the second embodiment.

FIG. 27 is an explanatory diagram illustrating a switch power state management table 530a according to the second embodiment.

Any switch power state management table 530 uses a switch 531, which indicates the identifier of the multi-root switch 300, as the key, and includes a power state 532, virtual switch states 533, and a total result 534. The power state 532 indicates the power on/off state of the multi-root switch 300. The virtual switch states 533 indicate, for each virtual switch number (VS#) of a virtual switch included in the multi-root switch 300, the power on/off state of the host 100 that is associated with the virtual switch number. The total result 534 indicates a result of compiling the values of the respective virtual switch states 533.

The virtual switch states which indicate the power on/off states of the virtual switches 430 are created by sorting the host-virtual switch management table 560 of FIG. 8 with the multi-root switches 300 as the key. The total result 534 has a value "On" when at least one of the virtual switches 430 is powered on, and a value "Off" when none of the virtual switches 430 are powered on. In the host-virtual switch management table 560 of FIG. 8, the host 100b and the host 100a are both "Off" and their associated virtual switches are accordingly all "Off". The compiled power states 532 of the multi-root switches 300 are therefore "Off" as well.

<Turning on of the Multi-Root Switches 300 Triggered by the Powering on of the Hosts 100>

Power saving control executed when the host 100a is powered on while the host 100b is kept turned off is described later.

Figure 28:
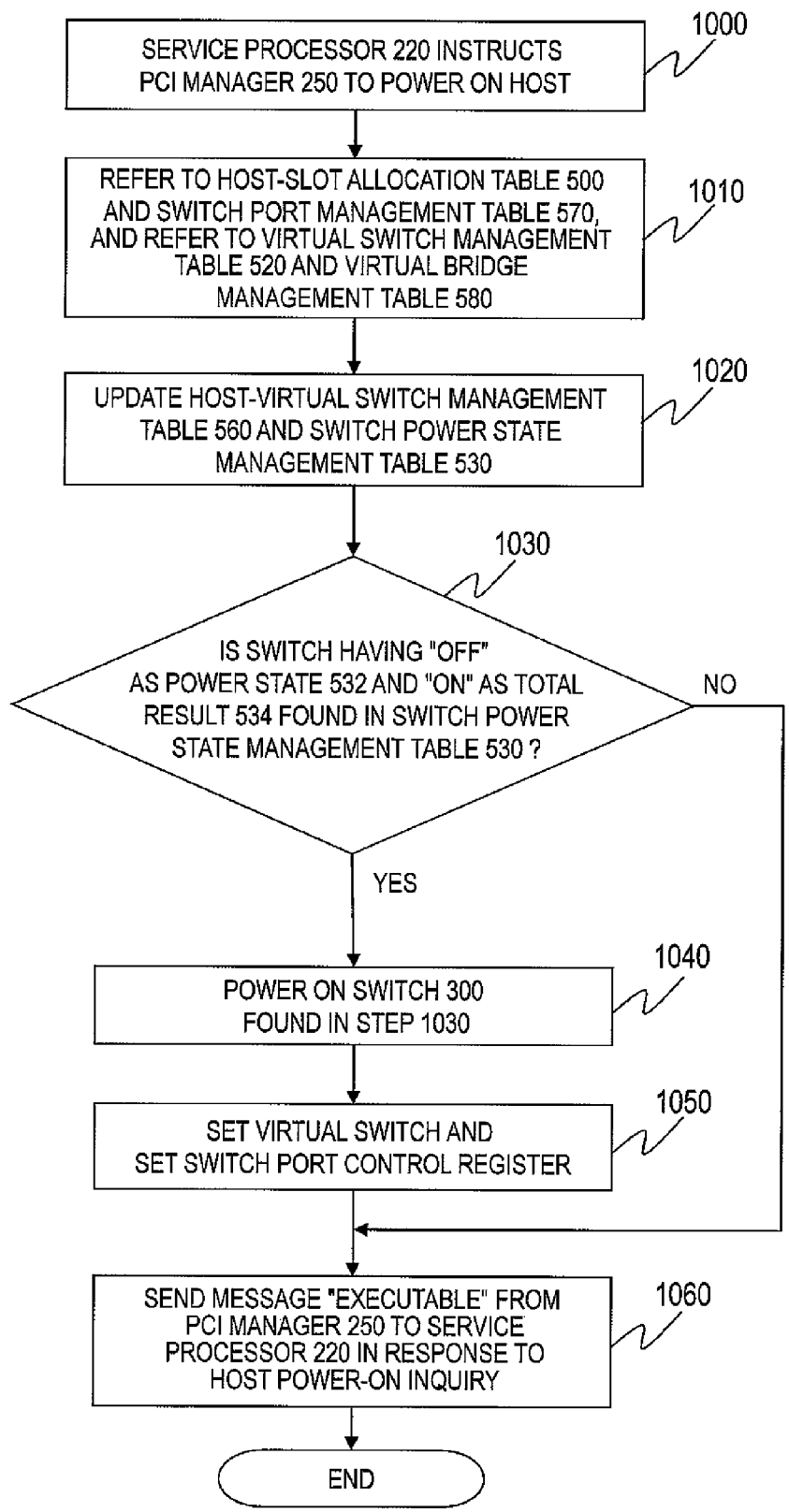
FIG. 28 is a flow chart illustrating a processing procedure of turning multi-root switches on with the powering on of the host as a trigger according to the second embodiment.

FIG. 28 is a flow chart illustrating a processing procedure of turning the multi-root switches 300 on with the powering on of the host 100a as a trigger according to the second embodiment.

When an instruction to power the host 100a on is input from the management console 240, the PCI manager 250 receives an instruction from the service processor 220 to power the host 100a on (Step 1000). The PCI manager 250 refers to the host-slot allocation table 500, the switch port management table 570, the virtual switch management table 520, and the virtual bridge management table 580 to find out the slots 320 that are allocated to the host 100a (Step 1010). The PCI manager 250 then updates the field of the power state 563 for the host 100a to "On" in a host-virtual switch management table 560c illustrated in FIG. 29 in accordance with the host-slot allocation table 500.

FIG. 29 is an explanatory diagram illustrating the host-virtual switch management table 560c according to the second embodiment.

Compared to the host-virtual switch management table 560 of FIG. 8, the host-virtual switch management table 560c of FIG. 29 is updated such that the power state 563 is "On" in a row that has the host 100a as the host 562.

FIG. 30 is an explanatory diagram illustrating a switch power state management table 530c according to the second embodiment.

With the power state 563 of the host 100a updated, the PCI manager 250 updates the value of the virtual switch state 533 to "On" for a virtual switch in the multi-root switch 300b that is assigned VS #2, thereby obtaining the switch power state management table 530c of FIG. 30. The PCI manager 250 updates the total result 534 to "On" as well because at least one of the virtual switches included in the multi-root switch 300b has "On" as the value of the virtual switch state 533 (Step 1020).

The PCI manager 250 checks whether or not there is the multi-root switch 300 that has "Off" as the power state 532 and "On" as the total result 534 (Step 1030).

When the multi-root switch 300 that has "Off" as the power state 532 and "On" as the total result 534 is found in Step 1030, this multi-root switch 300 (multi-root switch 300b in the second embodiment) is powered on (Step 1040). The virtual switches 430 to be included in the multi-root switch 300b are set by the PCI manager 250 (Step 1050).

After Step 1050, or when it is found in Step 1030 that none of the multi-root switches 300 has "Off" as the power state 532 and "On" as the total result 534, the PCI manager 250 sends to the service processor 220 a message to the effect that the powering on of the host 100a is permitted (Step 1060). The service processor 220 then powers the host 100a on.

At the time when the host 100a is booted up, the root port 160a-1 performs linkup as usual whereas linkup of the root port 160a-2 is not established because power to the multi-root switch 300a which is placed under the root port 160a-2 is cut off. Accordingly, the host 100a does not detect the multi-root switch 300a while being booted up. This is the same result as the one obtained in the first embodiment when the host 100a is powered on after linkup prevention is set to the upstream port 310a-2 of the multi-root switch 300a.

A case where the host 100b is powered on is described next.

The PCI manager 250 receives an instruction to power the host 100b on from the service processor 220, and then updates the power state 563 of the host 100b to "On" in the host-virtual switch management table 560.

FIG. 31 is an explanatory diagram illustrating a host-virtual switch management table 560d according to the second embodiment.

The host-virtual switch management table 560d of FIG. 31 is the host-virtual switch management table 560 in which the power state 563 of the host 100b is updated to "On" by the PCI manager 250.

With the power state 563 updated as illustrated in the host-virtual switch management table 560d, the PCI manager 250 updates the virtual switch states 533 to "On" in the switch power state management table 530 for a virtual switch of the multi-root switch 300b that is assigned a virtual switch number "1" and a virtual switch of the multi-root switch 300a that is assigned a virtual switch number "1".

With the virtual switch state 533 updated, the total result 534 of the multi-root switch 300a is updated to "On". The updated value "On" of the total result 534 in the switch power state management table 530 means that the multi-root switch 300a needs to be powered on.

FIG. 32 is an explanatory diagram illustrating a switch power state management table 530d according to the second embodiment.

The switch power state management table 530d of FIG. 32 is the switch power state management table 530 in which the virtual switch state 533 and total result 534 of the multi-root switch 300a are updated to "On" by the PCI manager 250.

The PCI manager 250 configures the virtual switches 430 after the multi-root switch 300a is powered on. With the multi-root switch 300a powered on, the PCI manager 250 needs to set the value "not linked" in the switch port control register 600 of FIG. 10 in accordance with the linkup preventing control determining table 590 of FIG. 9 as in the first embodiment.

Because the host 100a is already powered on, the automatic recognition of the multi-root switch 300a by the host 100a does not occur without requiring the explicit linkup prevention. Still, linkup prevention needs to be set in case of rebooting the host 100a. The PCI manager 250 therefore sets the switch port control register 600 as described above.

After finishing setting the virtual switches 430 and updating the switch port control register 600, the PCI manager 250 issues a permission to power the host 100b on to the service processor 220. The service processor 220 then powers the host 100b on.

<Turning Off of the Multi-Root Switches 300 Triggered by the Powering Off of the Hosts 100>

Described below is a case of powering off the host 100b in a state where the host 100a and the host 100b are running.

Figure 33:
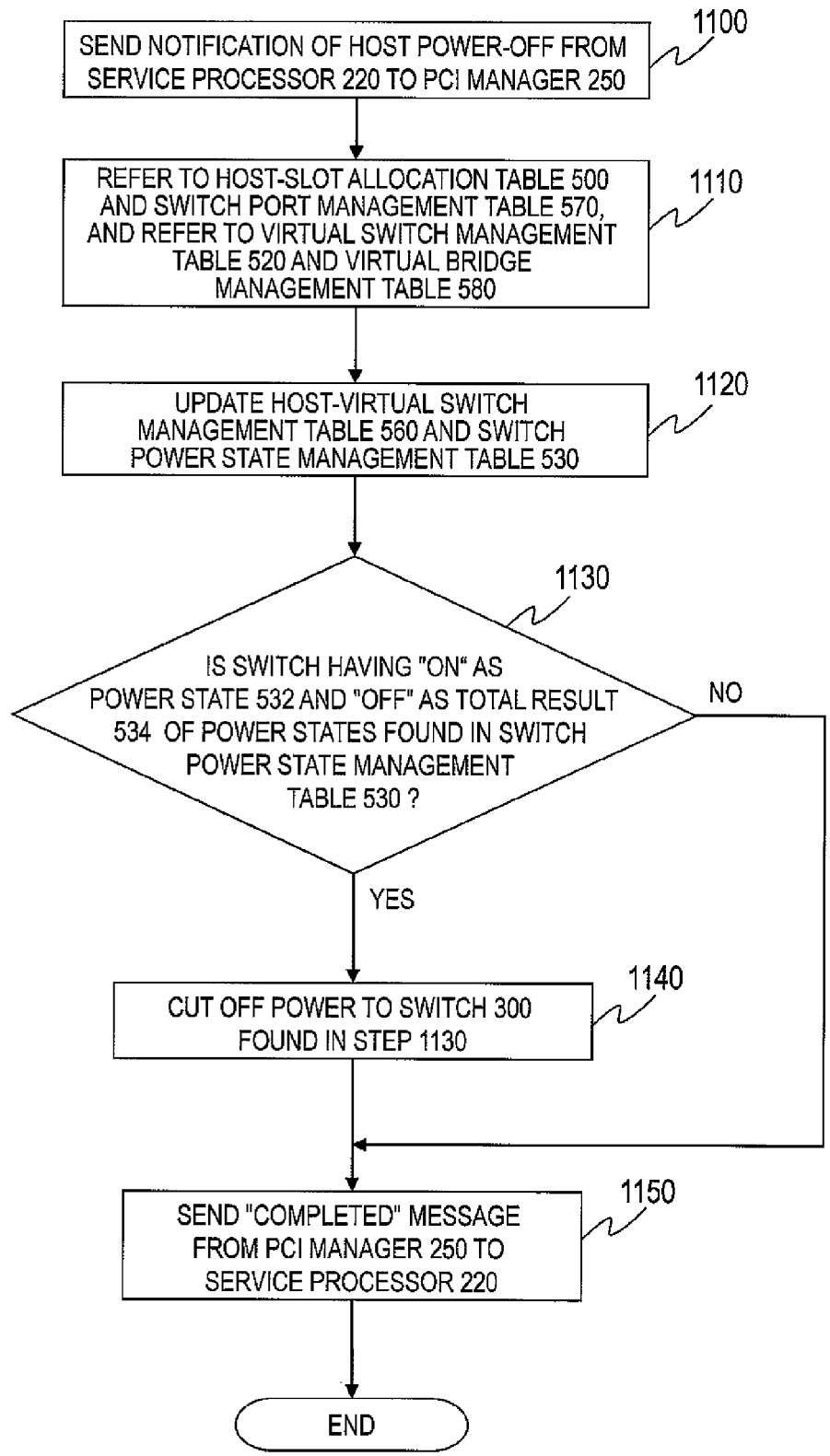
FIG. 33 is a flow chart illustrating processing of turning off the multi-root switches with the powering off of the host as a trigger according to the second embodiment.

FIG. 33 is a flow chart illustrating processing of turning off the multi-root switches 300 with the powering off of the host 100b as a trigger according to the second embodiment.

After the host 100b is powered off by the service processor 220, the service processor 220 sends a notification of the powering off of the host 100b to the PCI manager 250 via the PCIM management path 255 (Step 1100). Whereas a notification to the effect that one of the hosts 100 is to be powered on is sent by the service processor 220 to the PCI manager 250 before the host 100 is powered on (this is because the virtual switches 430 need to be configured prior to the powering on of the host 100), a notification of the powering off of one of the hosts 100 is sent by the service processor 220 to the PCI manager 250 after the host 100 is powered off.

Receiving the notification of the powering off of the host 100b, the PCI manager 250 updates the value of the power state 563 of the host 100b to "Off" in the host-virtual switch management table 560 in accordance with the host-slot allocation table 500 (Step 1110). With the host-virtual switch management table 560 updated, the PCI manager 250 updates the values of the virtual switch states 533 to "Off" in the switch power state management table 530 for a virtual switch of the multi-root switch 300b that is assigned a virtual switch number "1" and a virtual switch of the multi-root switch 300a that is assigned a virtual switch number "1" (Step 1120).

FIG. 34 is an explanatory diagram of a host-virtual switch management table 560e according to the second embodiment.

FIG. 34 illustrates a result of the update made by the PCI manager 250 in Step 1120 of FIG. 33.

FIG. 35 is an explanatory diagram of a switch power state management table 530e according to the second embodiment.

FIG. 35 illustrates a result of the update made by the PCI manager 250 in Step 1120 of FIG. 33.

The PCI manager 250 determines whether or not there is the multi-root switch 300 that has "On" as the power state 532 and "Off" as the total result 534 (Step 1130). In the switch power state management table 530e of FIG. 35, the multi-root switch 300a has "On" as the power state 532 and "Off" as the total result 534. The multi-root switch 300a can accordingly be powered off, and the PCI manager 250 powers off the multi-root switch 300a (Step 1140).

After Step 1140, or when it is found in Step 1130 that none of the multi-root switches 300 has "On" as the power state 532 and "Off" as the total result 534, the PCI manager 250 sends a message informing that the powering off has been completed to the service processor 220 (Step 1150).

A case where the host 100a is powered off is described next.

After the host 100a is powered off by the service processor 220, the service processor 220 sends a notification of the powering off of the host 100a to the PCI manager 250 via the PCIM management path 255.

Receiving the notification of the powering off of the host 100a, the PCI manager 250 updates the power state 563 of the host 100a to "Off" in the host-virtual switch management table 560.

FIG. 36 is an explanatory diagram of a host-virtual switch management table 560f according to the second embodiment.

FIG. 36 illustrates a result of updating the power state 563 of the host 100a to "Off" in the host-virtual switch management table 560 by the PCI manager 250.

With the update made as illustrated in the host-virtual switch management table 560f, the PCI manager 250 updates the virtual switch state 533 to "Off" in the switch power state management table 530 for a virtual switch of the multi-root switch 300b that is assigned a virtual switch number "2".

FIG. 37 is an explanatory diagram illustrating a switch power state management table 530f according to the second embodiment.

FIG. 37 illustrates a result of updating the virtual switch state 533 to "Off" in the switch power state management table 530 by the PCI manager 250.

The PCI manager 250 then updates the total result 534 of the multi-root switch 300b to "Off". The updated switch power state management table 530f shows that the multi-root switch 300b can be powered off. The PCI manager 250 accordingly powers the multi-root switch 300b off.

The second embodiment described above makes it possible to turn only a minimum number of multi-root switches on in conjunction with the powering on/off of hosts while turning unnecessary switches off. The computer system can thus be run saving power.

Third Embodiment

<Turning on of the Multi-Root Switches 300 Triggered by the Addition of Unallocated Slots 320 to a Running Host>

A third embodiment of this invention is described next. The third embodiment is an application of the second embodiment.

The computer system configuration and the host-slot allocation table 500 in an initial state of the third embodiment are the same as in the initial state of the second embodiment, namely, the same as in the initial state of the first embodiment. In the initial state of the third embodiment, the host 100b is powered off and the host 100a is running. The multi-root switch 300a is turned off and the multi-root switch 300b is turned on in the initial state of the third embodiment.

The host-virtual switch management table 560 and the switch power state management table 530 in the initial state of the third embodiment are the same as the host-virtual switch management table 560c and the switch power state management table 530c which are illustrated in FIG. 29 and FIG. 30, respectively.

Described below is a case of allocating the unallocated slots 320a-3 and 320a-4 to the host 100a in the initial state of the third embodiment.

The user or the system administrator uses the management console 240 to allocate the slots 320a-3 and 320a-4 to the host 100a based on the allocation of the slots 320 to the hosts 100 that is illustrated in FIG. 16 and FIG. 17B. A processing procedure of powering the multi-root switches 300 on with the allocation of the unallocated slots 320 to one of the hosts 100 as a trigger is illustrated in FIG. 38.

Figure 38:
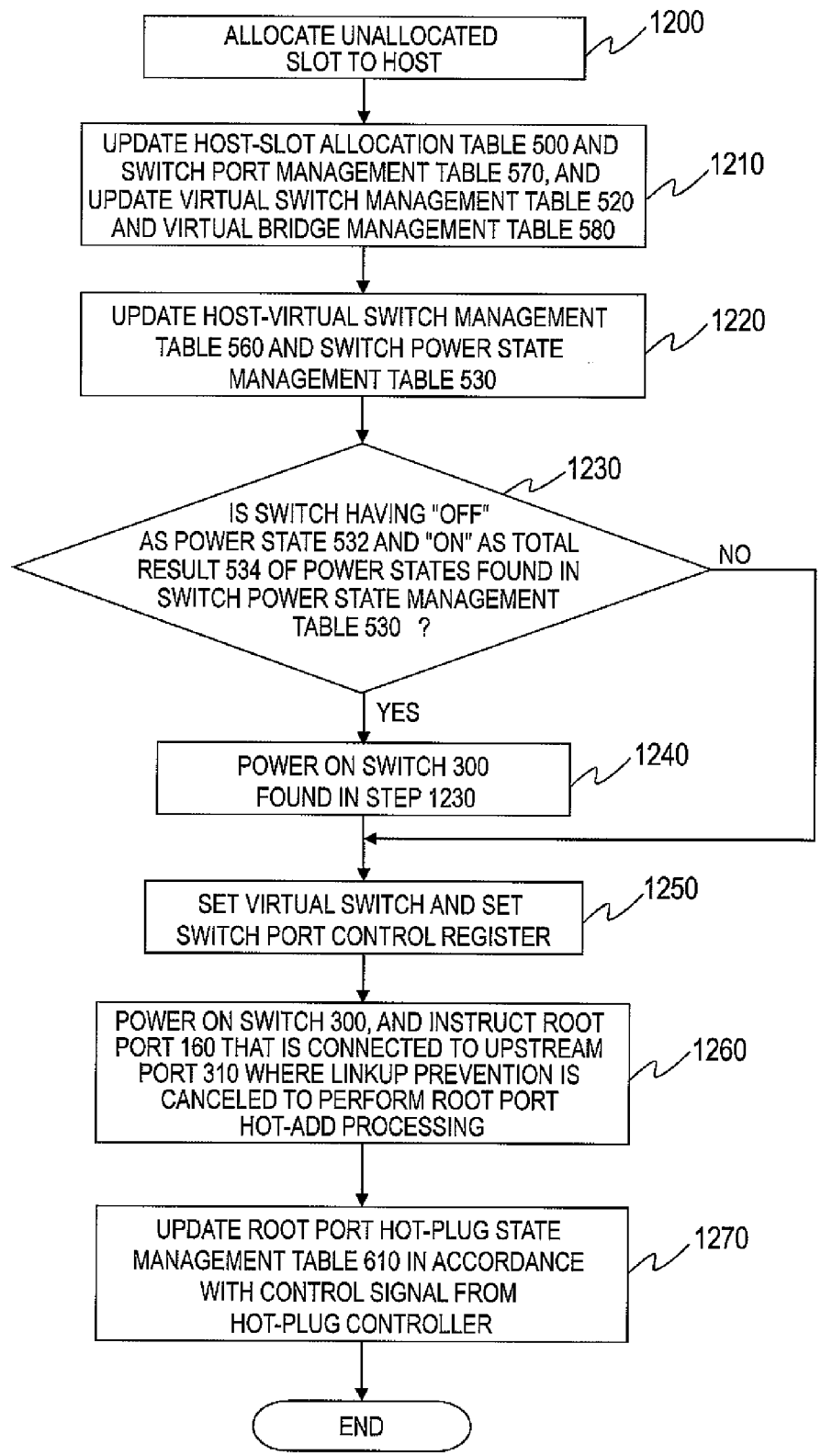
FIG. 38 is a flow chart illustrating a processing procedure of powering the multi-root switches on with the allocation of the unallocated slots to one of the hosts as a trigger.

FIG. 38 is a flow chart illustrating a processing procedure of powering the multi-root switches 300 on with the allocation of the unallocated slots 320 to one of the hosts 100 as a trigger.

The host 100a is allocated the slots 320a-3 and 320a-4 (Step 1200). The PCI manager 250 subsequently updates the host-slot allocation table 500 and the switch port management table 570, and also updates the virtual switch management table 520 and the virtual bridge management table 580. Results of the update made by the PCI manager 250 are the virtual switch management table 520b and the virtual bridge management table 580b which are illustrated in FIG. 19 (Step 1210).

The PCI manager 250 updates the host-virtual switch management table 560 as well.

FIG. 39 is an explanatory diagram illustrating a host-virtual switch management table 560g according to the third embodiment.

The host-virtual switch management table 560g is a result of updating the host-virtual switch management table 560 by the PCI manager such that the switch 565 and the virtual switch number 566 in the virtual switch list 564 of the host 100a have values "multi-root switch 300a" and "2", respectively.

The PCI manager 250 then updates the linkup preventing control determining table 590 as illustrated in the explanatory diagram of FIG. 21. The PCI manager 250 also updates the switch port control register 600b as illustrated in FIG. 22.

After making an update as illustrated in the host-virtual switch management table 560g, the PCI manager 250 updates the switch power state management table 530 as illustrated in FIG. 40.

FIG. 40 is an explanatory diagram illustrating a switch power state management table 530g according to the third embodiment.

With the virtual switch 430 that has a virtual switch number "2" added to the multi-root switch 300a, the PCI manager 250 updates the switch power state management table 530 into the switch power state management table 530g by changing the virtual switch state 533 from "–(nil)" to "On" for a virtual switch of the multi-root switch 300a that is assigned a virtual switch number "2" (Step 1220).

The PCI manager 250 determines whether or not the switch power state management table 530g has the switch 531 that has "Off" as the power state 532 and "On" as the total result 534 of the values of the virtual switch states 533 (Step 1230).

In the case where none of the multi-root switches 300 have "Off" as the power state 532 and "On" as the total result 534 of the values of the virtual switch states 533, the processing moves to Step 1250.

In the case where the multi-root switch 300 that has "Off" as the power state 532 and "On" as the total result 534 of the values of the virtual switch states 533 is found, the processing moves to Step 1240.

In the switch power state management table 530g, the multi-root switch 300a has "Off" as the power state 532 and "On" as the total result 534 of the values of the virtual switch states 533. The PCI manager 250 therefore powers the multi-root switch 300a on (Step 1240).

After Step 1240, or when it is found in Step 1230 that none of the multi-root switches 300 have "Off" as the power state 532 and "On" as the total result 534 of the values of the virtual switch states 533, the PCI manager 250 configures the virtual switches 430 and updates the switch port control register 600 (Step 1250).

Because the host 100a is already running and does not detect elements further down the PCI tree than the root port 160*a*-2, the root port hot-plug control module 540 notifies hot-add processing to the hot-plug controller 170*a*-2 of the host 100*a* (Step 1260).

The operation of the hot-add processing in the third embodiment is the same as in the first embodiment (Step 1270).

As described above, according to the third embodiment, the allocation of the unallocated slots 320 to the host 100 that is already running, in addition to the powering on of the hosts 100, can be used as a trigger for turning the multi-root switches 300 on.

<Turning Off of the Multi-Root Switches 300 Triggered by the Removal of the Allocated Slots 320 from the Running Host 100>

Lastly, a case of removing the slots 320*a*-3 and 320*a*-4 from the running host 100*a* and returning the slots 320*a*-3 and 320*a*-4 to an unallocated state is described.

Figure 41:
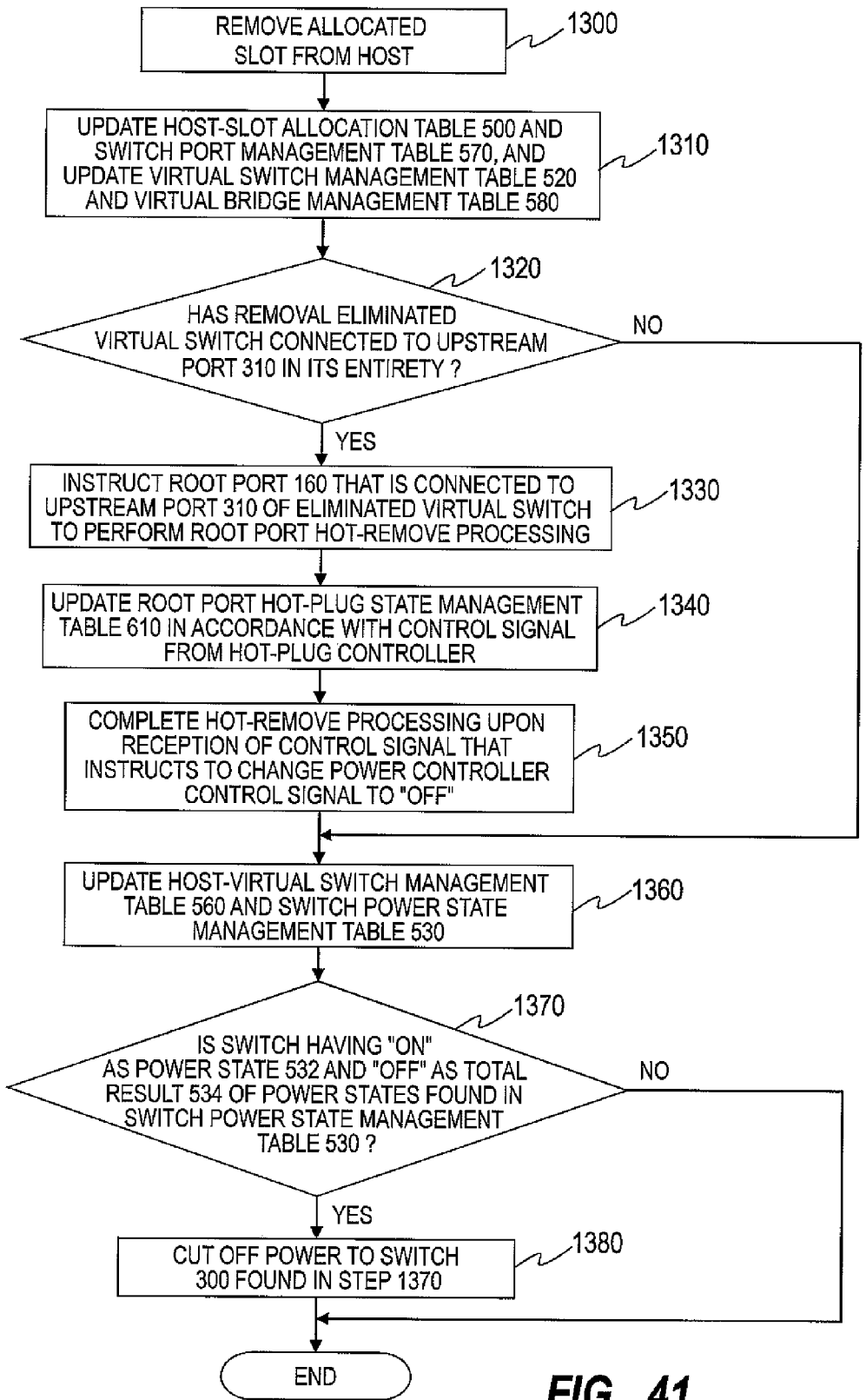
FIG. 41 is a flow chart illustrating processing of turning off the multi-root switch in time with the removal of the slots that have been allocated to the host according to the third embodiment.

FIG. 41 is a flow chart illustrating processing of turning off the multi-root switch 300 in time with the removal of the slots 320 that have been allocated to the host 100*a* according to the third embodiment.

Figure 42:
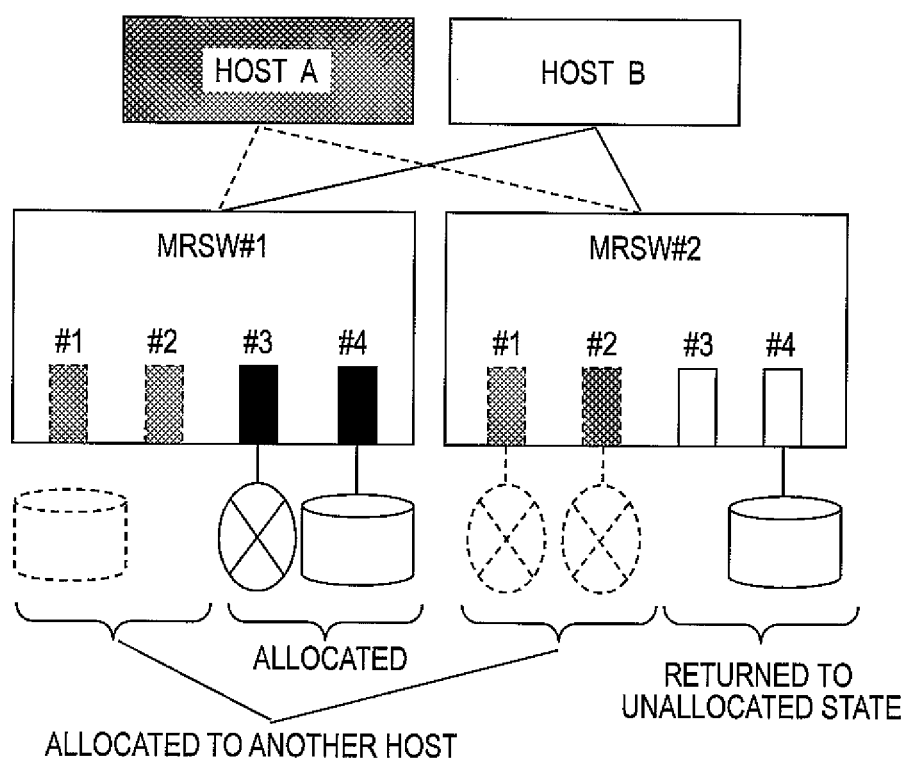
FIG. 42 is an explanatory diagram illustrating a GUI screen on which settings for removing the allocated slots from one of the hosts are set according to the third embodiment.

FIG. 42 is an explanatory diagram illustrating a GUI screen on which settings for removing the allocated slots 320 from one of the hosts 100 are set according to the third embodiment.

The user or the system administrator enters settings on the GUI screen of FIG. 42 to send an instruction to remove the slots #3 and #4 (downstream ports 320*a*-3 and 320*a*-4) of the MRSW #2 (multi-root switch 300*a*) from the host B (host 100*a*) and return the slots #3 and #4 (downstream ports 320*a*-3 and 320*a*-4) to an unallocated state to the PCI manager 250 through the management console 240 (Step 1300).

The host-slot allocation table 500 in this case is the host-slot allocation table 500*a* of FIG. 3A. The PCI manager 250 updates the virtual switch management table 520 and the virtual bridge management table 580 into the virtual switch management table 520*a* and the virtual bridge management table 580*a*, which are illustrated in FIG. 7, in accordance with the host-slot allocation table 500*a* (Step 1310). However, because this is an update of the virtual switches 430 made in association with the host 100*a* that is running, the update made by the PCI manager 250 to the virtual switch management table 520 and the virtual bridge management table 580 which are included in the PCI manager 250 is not reflected on the multi-root switch 300*a*.

The PCI manager 250 determines whether or not the removal of the slots 320*a*-3 and 320*a*-4 allocated to the multi-root switch 300*a* allows the virtual switch 430*a*-2, which is allocated to the host 100*a* via the upstream port 310*a*-2, to be removed (Step 1320).

When it is found in Step 1320 that the virtual switch 430*a*-2 cannot be removed, the host-virtual switch management table 560 and the switch power state management table 530 are updated (Step 1360).

When it is found in Step 1320 that the virtual switch 430*a*-2 can be removed, the root port hot-plug control module 540 of the PCI manager 250 starts performing hot-remove processing on the root port 160*a*-2 of the host 100*a*, which is connected via the upstream port 310*a*-2 to the virtual switch 430*a*-2 to be removed (Step 1330).

The Hot-plug signal control module 190*a* is instructed via the PCIM management path 255 and the host management path 230*a* to perform the hot-remove processing, and the attention button pressed signal 180-5 notifies the relevant CPU 110*a* of the hot-plug interruption via the hot-plug controller 170*a*-2 (attention buttons have a toggle key function and, in the case of the slot 320 that has been added, the attention button pressed signal 180-5 signifies a hot-remove notification).

Receiving the hot-plug interruption notification, the OS 210*a* and the BIOS 200*a* execute the hot-remove processing. As a result of the hot-remove processing, the root port hot-plug control module 540 is notified via the hot-plug controller 170*a*-2 that power to the slots 320 is cut off by means of the power controller control signal 180-3. The PCI manager 250 updates the root port hot-plug state management table 610 in accordance with the power controller control signal 180-3 used for the notification (Step 1340).

The PCI manager 250 is notified by the OS 210*a* and the BIOS 200*a* in the host 100*a* that the elements further down the PCI tree than the root port 160*a*-2 have been disconnected, whereby the hot-remove processing is completed (Step 1350).

With the virtual switch management table 520 updated, the PCI manager 250 updates the relevant tables. The host-virtual switch management table 560 is updated by removing the virtual switch VS #2 of the multi-root switch 300*a* from the virtual switch list 564 of the host 100*a* as illustrated in a host-virtual switch management table 560*h* of FIG. 43 (Step 1360).

FIG. 43 is an explanatory diagram illustrating the host-virtual switch management table 560*h* according to the third embodiment.

FIG. 44 is an explanatory diagram illustrating a switch power state management table 530*h* according to the third embodiment.

The switch power state management table 530 is updated in Step 1360 into the switch power state management table 530*h* by changing the virtual switch state 533 from "On" to "–" (nil) for the virtual switch VS #2 of the multi-root switch 300*a*. The PCI manager 250 determines whether or not there is the multi-root switch 300 that has "On" as the power state 532 and "Off" as the total result 534 (Step 1370).

When the multi-root switch 300 that has "On" as the power state 532 and "Off" as the total result 534 is found, the multi-root switch 300*a* can be turned off and the PCI manager 250 therefore turns the multi-root switch 300*a* off (Step 1380).

As described above, the dynamic removal of the slots 320 that have been allocated to the running hosts 100, in addition to the powering off of the hosts 100, can be used as a trigger for turning the multi-root switches 300 off.

This embodiment accordingly needs to prepare no virtual switches 430 in the multi-root switches 300 whose slots 320 are all unallocated slots while the hosts 100 are being booted up or running, which means that the configuration of the virtual switches 430 can be changed dynamically after the hosts 100 are booted up and the slots 320 are allocated. This embodiment is thus reduced in the amount of resources for the virtual switches 430 that are required to be held in the multi-root switches 300.

Figure 45A:
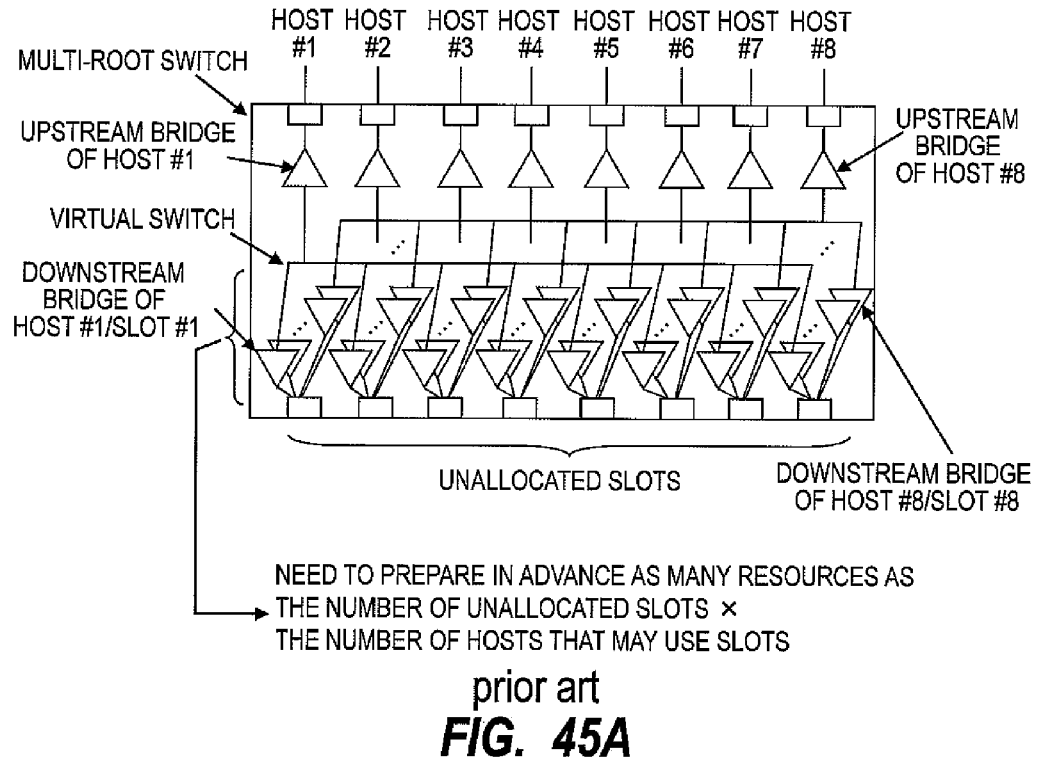
FIG. 45A is an explanatory diagram illustrating the number of resources in the related art.
Figure 45B:
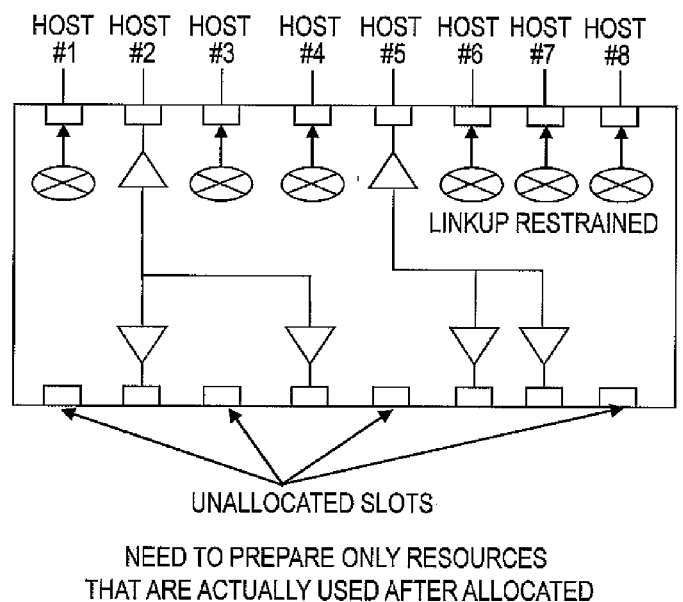
FIG. 45B is an explanatory diagram illustrating the number of resources in this embodiment.

FIGS. 45A and 45B are conceptual diagrams illustrating a comparison in resource amount between the related art and this embodiment.

FIG. 45A is an explanatory diagram illustrating the number of resources in the related art.

The related art illustrated in FIG. 45A needs to prepare resources for (number of the upstream ports 310)×(number of the slots 320) downstream bridges 440, and as many hot-plug controllers 170 as the number of the downstream bridges 440. In FIG. 45 where there are eight upstream ports 310 and eight slots 320, the resource number of the downstream bridges 440 is calculated by 8×8, sixty-four in total.

When the multi-root switches 300 are given a cascade configuration in the related art, a plurality of hosts 100 share one upstream port 310 and therefore the necessary resource amount of the downstream bridges 440 is even larger. In the case where two stages of the multi-root switches 300 each having eight upstream ports and eight downstream ports are used in combination, resources that need to be prepared in the second stage multi-root switch 300 are for 8×8×8=512 downstream bridges 440 in total.

FIG. 45B is an explanatory diagram illustrating the number of resources in this embodiment.

FIG. 45B illustrates a resource arrangement in this embodiment. This embodiment prevents the host 100 that has been allocated no slots 320 from detecting the multi-root switches 300, thereby eliminating the need to reserve resources for the downstream bridges 440 and keeping the amount of resources reserved in the LSI small.

Another effect is that power consumption of the multi-root switches 300 can be reduced because turning on the multi-root switch 300 whose slots 320 are not allocated to any running host 100 can be put off until the slots 320 are allocated to the hosts 100.

The embodiments described above show examples in which the service processor 220 and the PCI manager 250 are constituted of different computers, but the two may be integrated into one computer. Specifically, a power control module which controls the power on/off or running/shutdown state of the hosts 100, a switch management module which manages the multi-root switches 300, and the root port hot-plug control module 540 which notifies the hosts 100 of control signals relevant to hot-plug of the I/O devices 420 may be executed in a single computer.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
   at least one of a plurality of computers each having processors, memories, and interfaces;
   at least one of PCI switches each comprising first ports and second ports;
   I/O devices each coupled to each of the PCI switches;
   a switch management module for managing a configuration of each of the PCI switches; and
   a power control module which is coupled to the plurality of computers to control powering on and off of the plurality of computers,
   wherein each of the first orts is coupled to one of the interfaces of each of the plurality of computers;
   wherein each of the second ports is coupled to one of the I/O devices;
   wherein the switch management module includes:
   an identifying module for identifying a first port coupled to one of the plurality of computers that is to be booted up, and notifying one of the PCI switches of the identified first port;
   an instruction module for instructing the power control module to boot up the one of the plurality of computers coupled to the identified first port; and
   an allocation management module for managing allocation of one of the I/O devices to the one of the plurality of computers, and notifying the one of the PCI switches of the allocation of the one of the I/O devices to the one of the plurality of computers after the one of the plurality of computers is booted up, and wherein the each of the PCI switches includes:
   a preventing control module for preventing the one of the plurality of computers from detecting a configuration of the identified first port based on a result of the identification of the identified first port; and
   a virtual switch generating module for allocating a virtual hot-plug controller and resources for generating a virtual switch which includes a virtual bridge, and for generating a virtual switch that couples the identified first port and one of the second ports based on the notification of the allocation from the allocation management module,
   wherein the each of the PCI switches further includes a plurality of physical hot-plug management modules for detecting that a new I/O device is coupled to one of the second ports, and notifying the switch management module of hot-plug of coupling to one of the second ports,
   the allocation management module receives information about a computer specified to be allocated the new I/O device, notify one of the PCI switches of generation of a virtual switch that couples the new I/O device and the specified computer, and the switch management module notifies the specified computer of the hot-plug, and
   the each of the PCI switches includes the virtual switch generating module for allocating the virtual hot-plug controller and the virtual bridge to generate the virtual switch.

2. The computer system according to claim 1, wherein the power control module monitors a state of power supply of the plurality of computers,
   the switch management module obtains a state of power supply of the one of the plurality of computers that is instructed to be booted up from the power control module, and
   in a case where the obtained state of power supply represents that the one of the plurality of computers completes booting up, the allocation management module sends the notification of the allocation to instruct the one of the PCI switches to cancel the prevention on the identified first port, and the switch management module notifies the one of the plurality of computers that has completed the booting up of hot-plug of the one of the I/O devices.

3. The computer system according to claim 1, wherein the PCI switches are multi-root switches, and
   the preventing control module prevents the one of the plurality of computers from detecting the configuration of the identified first port by setting the identified first port as a blocked port.

4. The computer system according to claim 1, wherein the each of the PCI switches further includes a switch power control module for powering the each of the PCI switches on and off based on an instruction from the switch management module, and
   in a case where the one of the PCI switches that is coupled to the one of the plurality of computers to be booted up is powered off, the allocation management module instructs the switch power control module of the one of the PCI switches that is powered off to power the one of the PCI switches on.

5. The computer system according to claim 4, wherein the allocation management module notifies the one of the PCI switches that is instructed by the allocation management module to power on of the allocation of the one of the I/O devices to the one of the plurality of computers, and the switch management module notifies the one of the plurality of computers of hot-plug of the one of the I/O devices.

6. The computer system according to claim 5, wherein,
the switch management module instructs to the one of the PCI switches to remove a virtual switch that couples the one of the I/O devices to the one of the plurality of computers in a case of reception of an instruction to remove the one of the I/O devices,
the switch management module instructs the switch power control module of the one of the PCI switches to power the one of the PCI switches off in a case where one of the virtual switches of the one of the PCI switches that is coupled to the one of the I/O devices is removed, and
the each of the PCI switches further includes the virtual switch generating module for allocating, to another virtual switch, the virtual hot-plug controller and the resources for the virtual switch including the virtual bridge which are allocated to the removed virtual switch.

* * * * *